US012431932B2

(12) United States Patent
Manivannan et al.

(10) Patent No.: US 12,431,932 B2
(45) Date of Patent: *Sep. 30, 2025

(54) WEARABLE COMMUNICATIONS NODE WITH MESH NETWORKING CAPABILITIES

(71) Applicant: Vorbeck Materials Corp., Jessup, MD (US)

(72) Inventors: Sriram Manivannan, Elkridge, MD (US); Jennifer Pinkos, Hanover, MD (US); James Allen Turney, Silver Spring, MD (US); Michael Filipelli, Washington, MD (US); Christie Burrow, New Market, MD (US); Victor Contreras, Baltimore, MD (US); Dan Scheffer, Frederick, MD (US)

(73) Assignee: Vorbeck Materials Corp., Jessup, MD (US)

( * ) Notice: Subject to any disclaimer, the term of this patent is extended or adjusted under 35 U.S.C. 154(b) by 458 days.

This patent is subject to a terminal disclaimer.

(21) Appl. No.: 17/749,129

(22) Filed: May 19, 2022

(65) Prior Publication Data
US 2023/0208464 A1 Jun. 29, 2023

Related U.S. Application Data

(60) Provisional application No. 63/190,449, filed on May 19, 2021.

(51) Int. Cl.
*H04B 1/38* (2015.01)
*H01Q 1/27* (2006.01)
(Continued)

(52) U.S. Cl.
CPC .............. *H04B 1/385* (2013.01); *H01Q 1/273* (2013.01); *H01Q 1/526* (2013.01);
(Continued)

(58) Field of Classification Search
CPC .................. H04B 1/385; H04B 1/3883; H04B 2001/3855; H01Q 1/273; H01Q 1/526; H04W 84/18
See application file for complete search history.

(56) References Cited

U.S. PATENT DOCUMENTS 7,658,901 B2  2/2010  Prud'Homme et al.
8,278,757 B2  10/2012  Crain et al.
(Continued)

*Primary Examiner* — Junpeng Chen
(74) *Attorney, Agent, or Firm* — Woods Oviatt Gilman LLP; Trent V. Bolar, Esq.

(57) ABSTRACT

Embodiments relate to a wearable communications node (WCN) with mesh networking capabilities. The WCN, which is worn on the user's torso, includes an enclosure and shoulder strap(s) as well as communications device, antenna element(s), and battery conductively coupled to a control circuit. The enclosure includes a top area and an oppositely positioned bottom area. The shoulder strap is pivotably attached proximate to the top area and the bottom area. The communications device is rigidly affixed within the enclosure. The antenna element is conductively coupled to the communications device as well as rigidly affixed to the enclosure or flexibly affixed the shoulder strap. The control circuit is configured to establish, via the communications device, a self-organizing wide area network with a plurality of computing devices that each connects directly, dynamically, and non-hierarchically to the WAN. The antenna element includes a conductive composition that includes graphene dispersed in a polymer matrix.

15 Claims, 30 Drawing Sheets

(51) Int. Cl.
  *H01Q 1/52*  (2006.01)
  *H04B 1/3827*  (2015.01)
  *H04B 1/3883*  (2015.01)
  *H04W 84/18*  (2009.01)

(52) U.S. Cl.
  CPC ... *H04B 1/3883* (2013.01); *H04B 2001/3855* (2013.01); *H04W 84/18* (2013.01)

(56) References Cited

U.S. PATENT DOCUMENTS

| | | |
|---|---|---|
| 10,601,104 B2 | 3/2020 | Manivannan et al. |
| 2006/0125630 A1* | 6/2006 | Parkulo ................. H04W 84/18 340/539.12 |
| 2007/0281745 A1* | 12/2007 | Parkulo ................ G08B 25/009 455/557 |
| 2008/0007396 A1* | 1/2008 | Parkulo ................. G01S 13/878 340/539.2 |
| 2015/0237217 A1* | 8/2015 | Roark .................... A45C 15/00 248/68.1 |
| 2016/0078749 A1* | 3/2016 | Parkulo ................. A62C 27/00 340/691.6 |
| 2019/0374133 A1* | 12/2019 | Shen ................. G08B 21/0446 |
| 2020/0387929 A1* | 12/2020 | Zhu ......................... G06F 16/29 |
| 2021/0143769 A1* | 5/2021 | Fogarty, Jr. ............. A47L 5/365 |
| 2021/0235410 A1* | 7/2021 | Hollar ..................... H04W 4/80 |
| 2022/0021062 A1* | 1/2022 | Chartier ................ H02J 7/0048 |
| 2022/0104670 A1* | 4/2022 | McCue .................... A47L 9/30 |

* cited by examiner

WEARABLE COMMUNICATIONS NODE WITH MESH NETWORKING CAPABILITIES

CROSS-REFERENCE TO RELATED APPLICATIONS

This application claims the benefit of U.S. Provisional Application No. 63/190,449 filed May 19, 2021, which is a continuation-in-part of U.S. patent application Ser. No. 16/925,581 filed Jul. 10, 2020 (issued as U.S. Pat. No. 11,265,410), which claims the benefit of U.S. Provisional Application No. 62/957,421 filed Jan. 6, 2020. These applications are hereby incorporated herein by reference.

TECHNICAL FIELD

Background

The present invention relates generally to communications nodes and specifically to wearable communications nodes with mesh networking capabilities.

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using infra-red transmissions or transmissions in a portion of the electromagnetic spectrum.

Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

One example of a mesh network is an 802.11b access mesh. If a set of users in close geographical proximity are equipped with 802.11b cards, they can communicate with other users in a series of hops until reaching an access point of the mesh network. Typically the access point is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between users and access points, and hence to reduce latency and an amount of occupied bandwidth on the mesh.

An example of a conventional arrangement of wireless meshes is shown in FIG. 1A. Another example of a wireless mesh network is given in US Patent application publication no. US 2002/0159409 A1, the content of which is hereby incorporated herein by reference. In the example illustrated in FIG. 1A, a number of different mesh networks 10 are shown, each of which may be on the scale of a neighborhood. Each mesh network 10 has a number of relay points 1 connected together and configured to handle traffic on the mesh. For example, each household in a neighborhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

In the example illustrated in FIG. 1A, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 1B, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

Hand-held (i.e. portable) communications systems, such as walkie-talkies and other portable radio transceivers, are used by military personnel, law enforcement officials, first responders, as well as civilians. However, such systems typically utilize one or more conspicuous antennas, such as whip antennas, which typically consist of a straight flexible metal wire or rod embedded in polymer material. The bottom end of whip antennas are communicatively coupled to the transceiver of the handheld communications system. Whip antennas are typically designed to be flexible to reduce breaking. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments. Therefore, a mesh networking wearable communications system with antennas that are not vulnerable to entanglement would be beneficial to consumers.

BRIEF DESCRIPTION OF THE DRAWINGS

FIG. 16 illustrates a cut-through view of the housing, View A of FIG. 14, in accordance with certain embodiments.

DETAILED DESCRIPTION

Figure 1A:
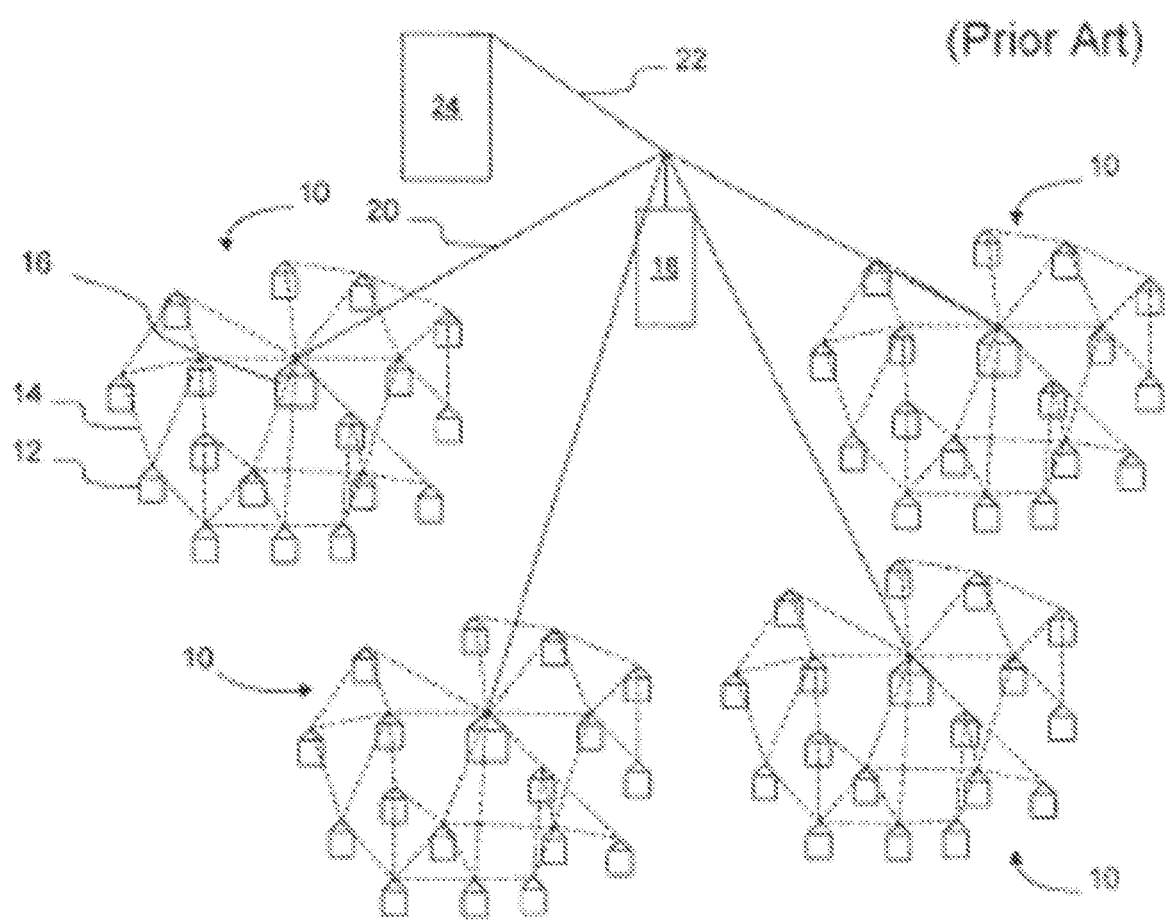
FIG. 1A is prior art that depicts a conventional arrangement of wireless mesh communications network.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, the terms "downstream" and "upstream" referring, respectively, to directions in and opposite that of fluid flow, and the terms "proximate" and "distal" referring, respectively, to positioning that is near or situated away from a point of reference. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

As will be appreciated by one skilled in the art, aspects of the instant disclosure may be embodied as a system, method or computer program product. Accordingly, aspects of the instant disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the instant disclosure may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The instant disclosure relates generally to communications nodes and specifically to wearable communications nodes (hereinafter "WCN") with mesh networking capabilities. The instant disclosure seeks to provide WCNs that include antenna elements that have a reduced visual signature. The instant disclosure further seeks to provide antenna elements that are flexible and foldable and can substantially conform to the contours of the user without a statistically significant (e.g., greater than 0.5 dB) loss in performance.

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using infra-red transmissions or transmissions in a portion of the electromagnetic spectrum.

Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

One example of a mesh network is an 802.11b access mesh. If a set of users in close geographical proximity are equipped with 802.11b cards, they can communicate with other users in a series of hops until reaching an access point of the mesh network. Typically the access point is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between users and access points, and hence to reduce latency and an amount of occupied bandwidth on the mesh.

An example of a conventional arrangement of wireless meshes is shown in FIG. 1A. Another example of a wireless mesh network is given in US Patent application publication no. US 2002/0159409 A1, the content of which is hereby incorporated herein by reference. In the example illustrated in FIG. 1A, a number of different mesh networks 10 are shown, each of which may be on the scale of a neighborhood. Each mesh network 10 has a number of relay points 1 connected together and configured to handle traffic on the mesh. For example, each household in a neighborhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

Figure 1B:
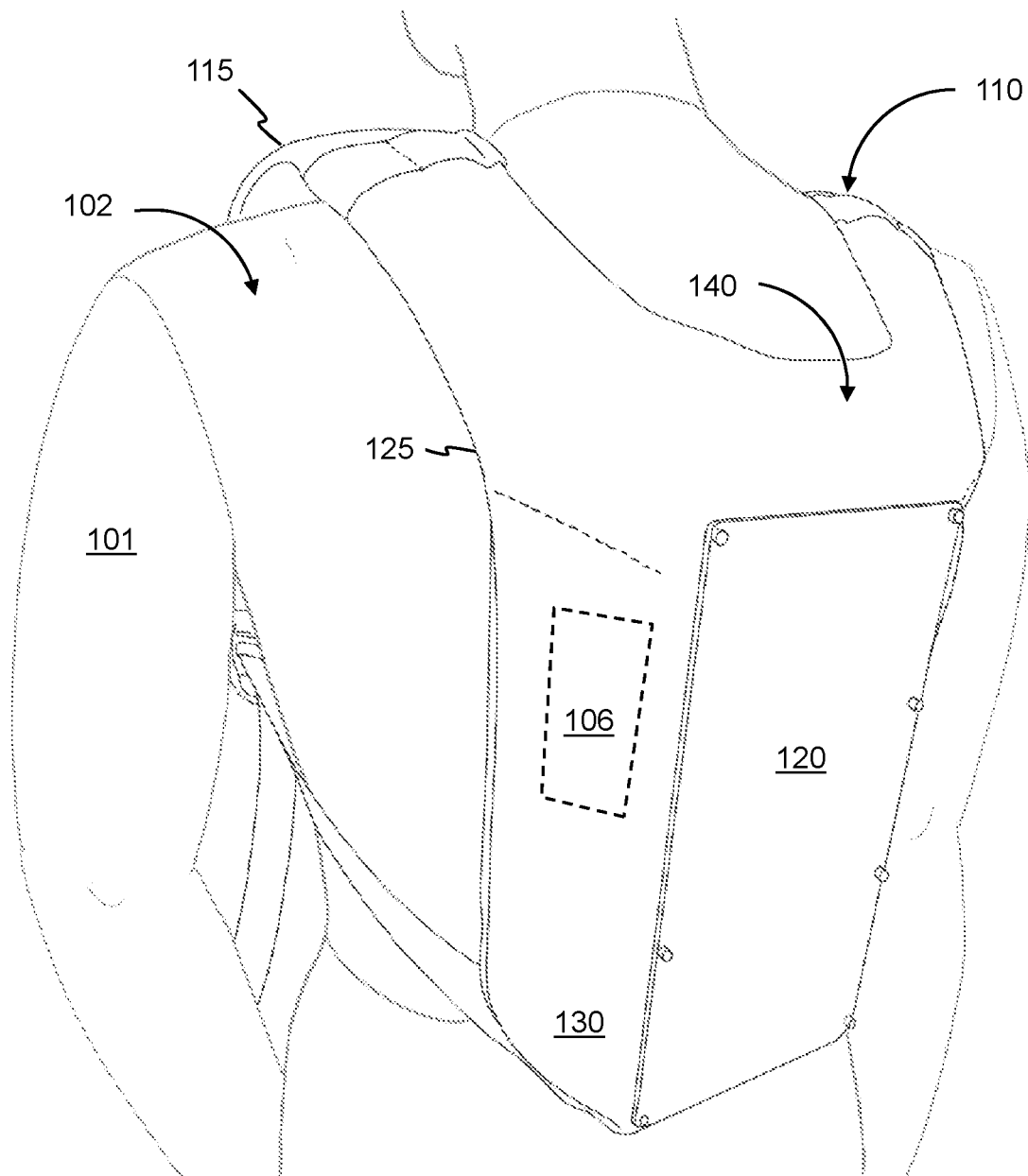
FIG. 1B illustrates a rear view of a user wearing a wearable communications node (hereinafter "WCN"), in accordance with some embodiments.
Figure 2:
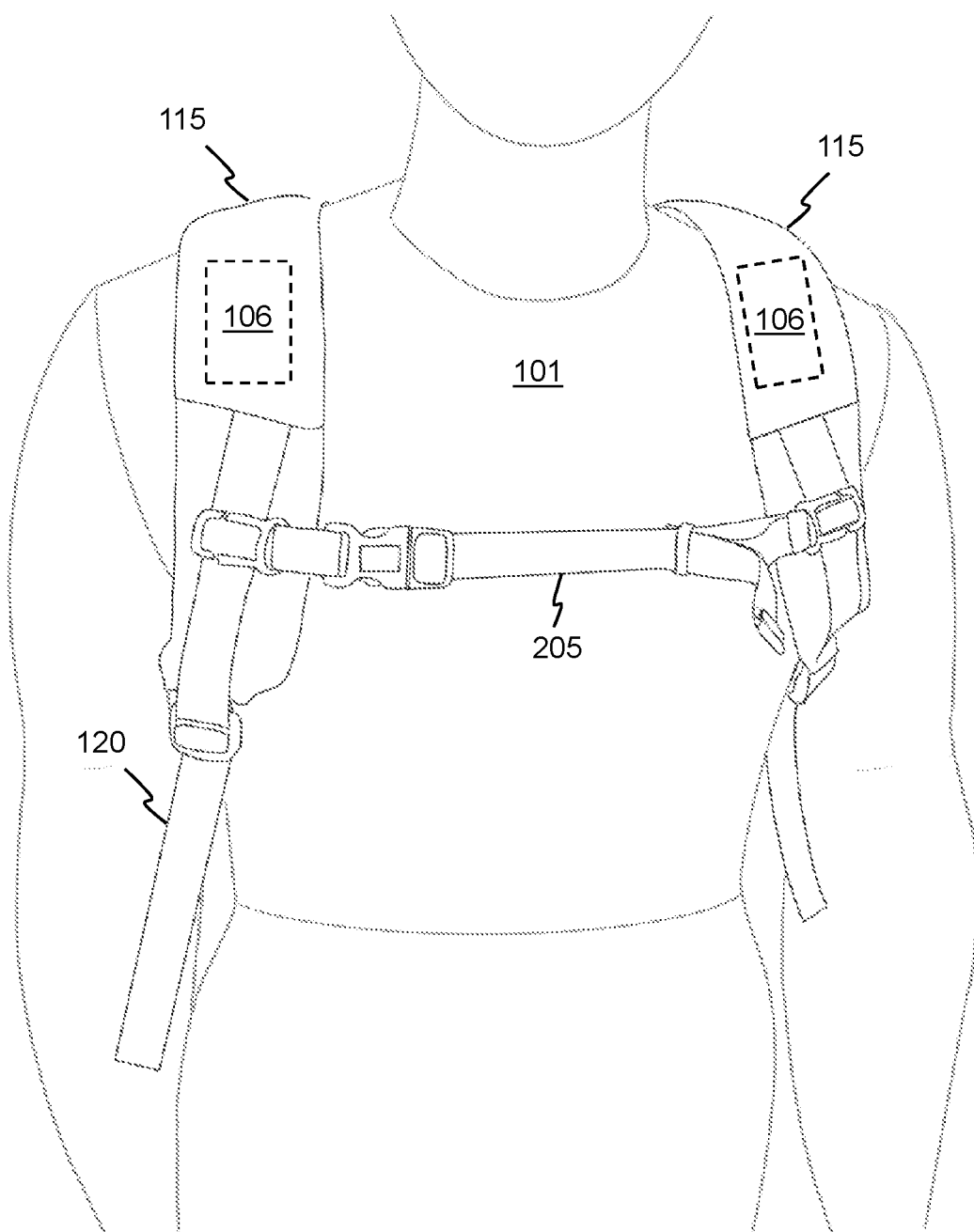
FIG. 2 illustrates front view of the user from FIG. 1B wearing the WCN, in accordance with yet still other embodiments.
Figure 3:
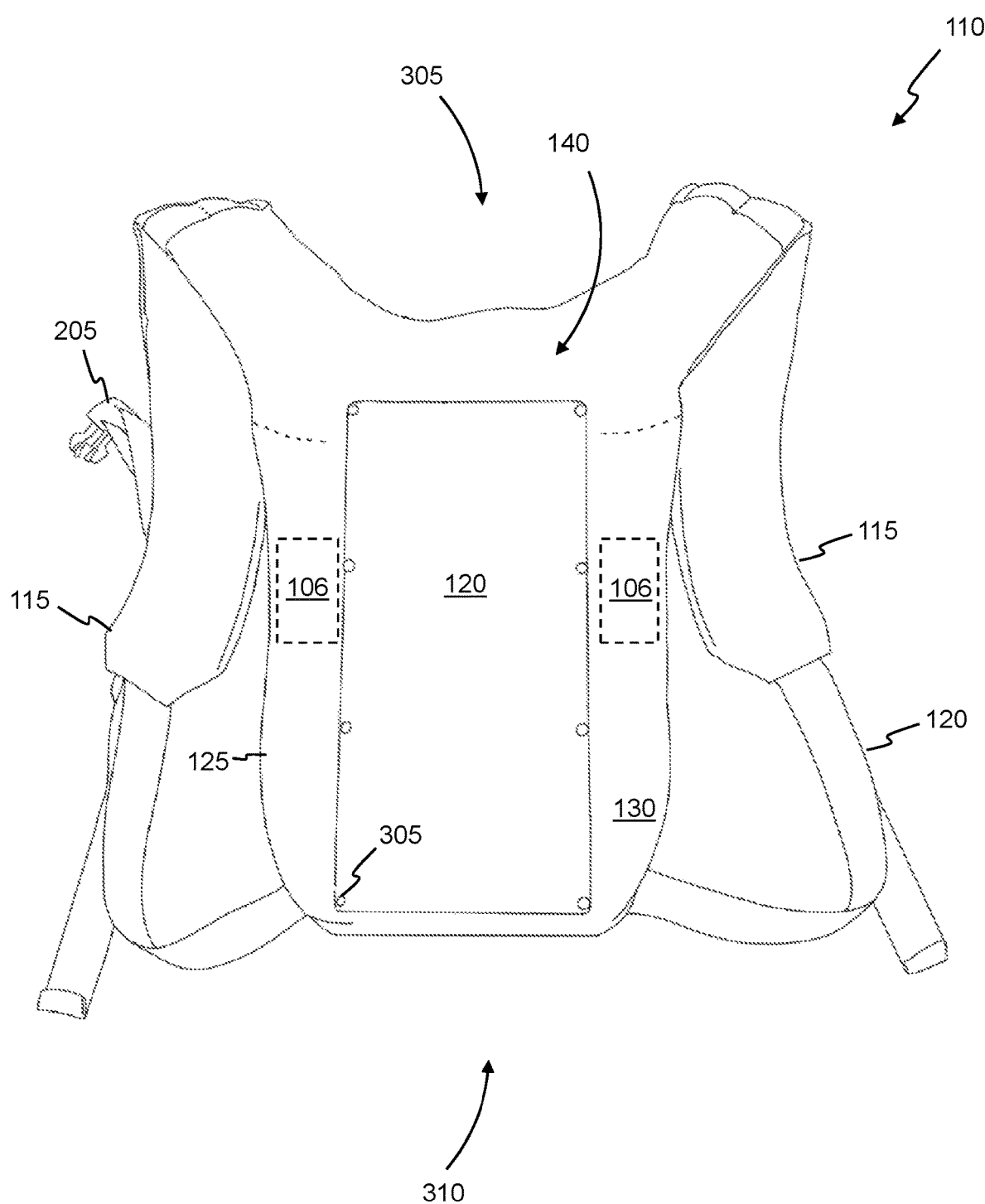
FIG. 3 illustrates a front view of the WCN, in accordance with other embodiments.
Figure 4:
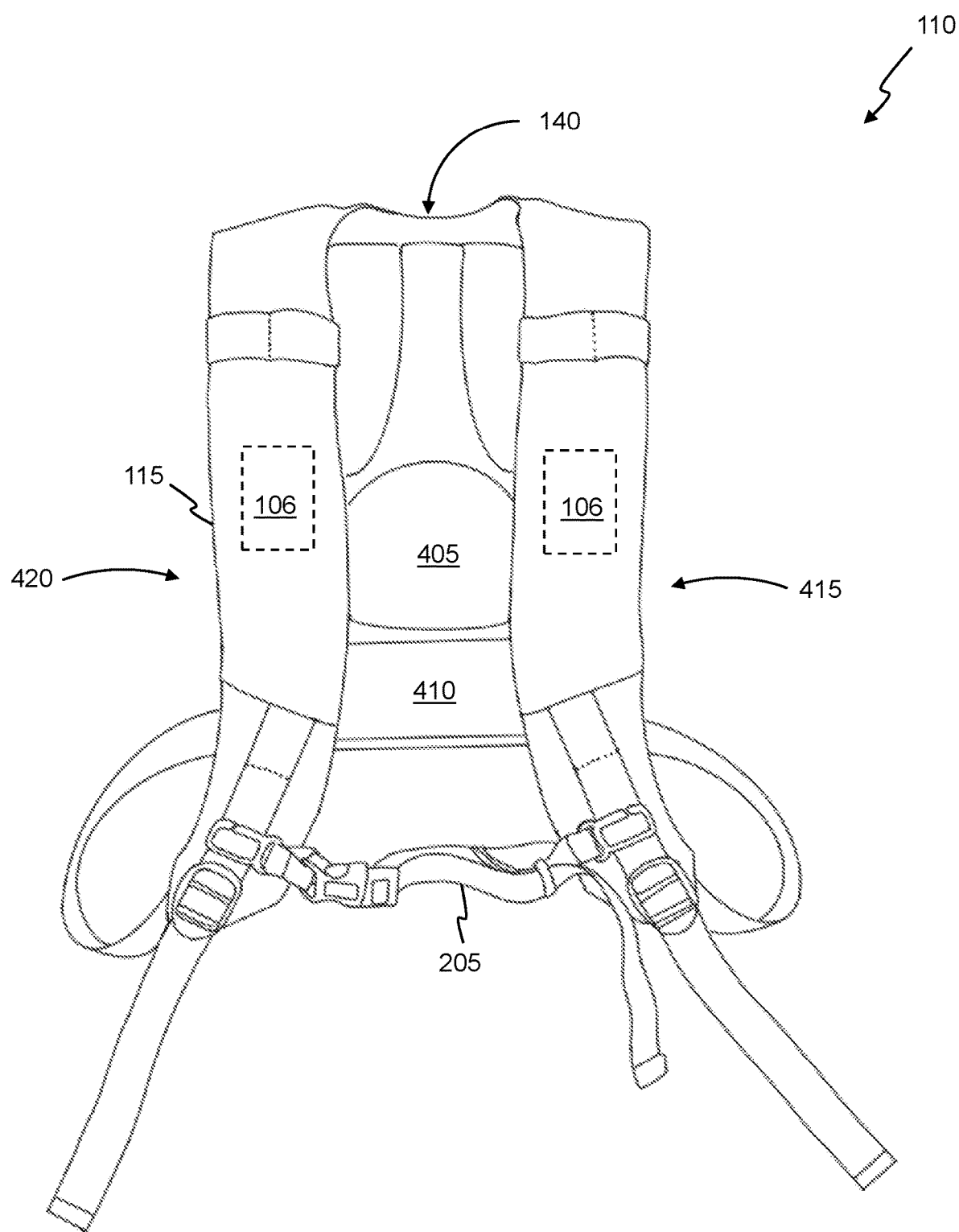
FIG. 4 illustrates a rear view of view of the WCN, in accordance with certain embodiments.
Figure 5:
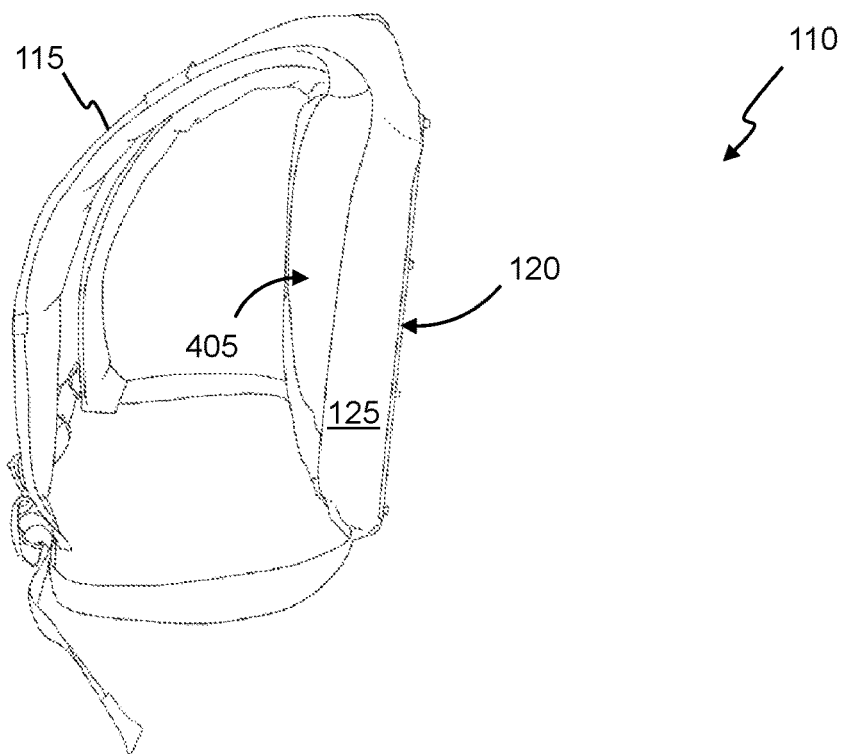
FIG. 5 illustrates a left view of the WCN, in accordance with yet still other embodiments.
Figure 6:
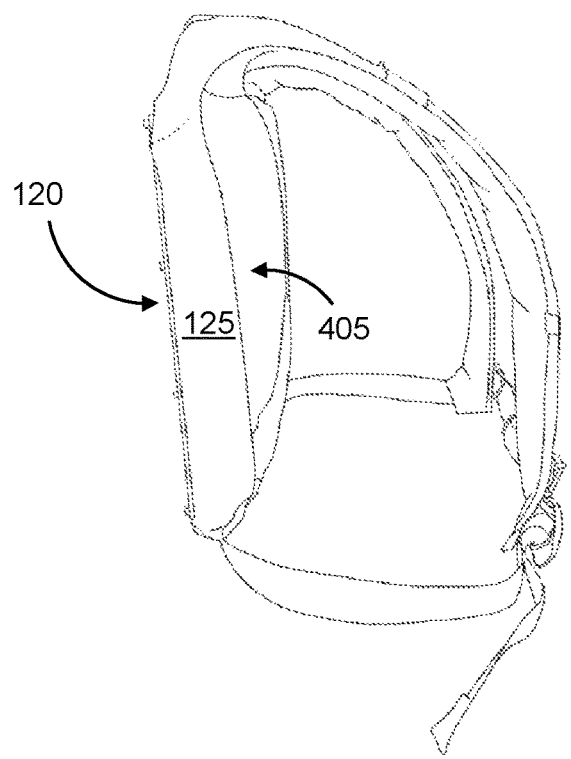
FIG. 6 illustrates a right view of the WCN, in accordance with some embodiments.
Figure 7:
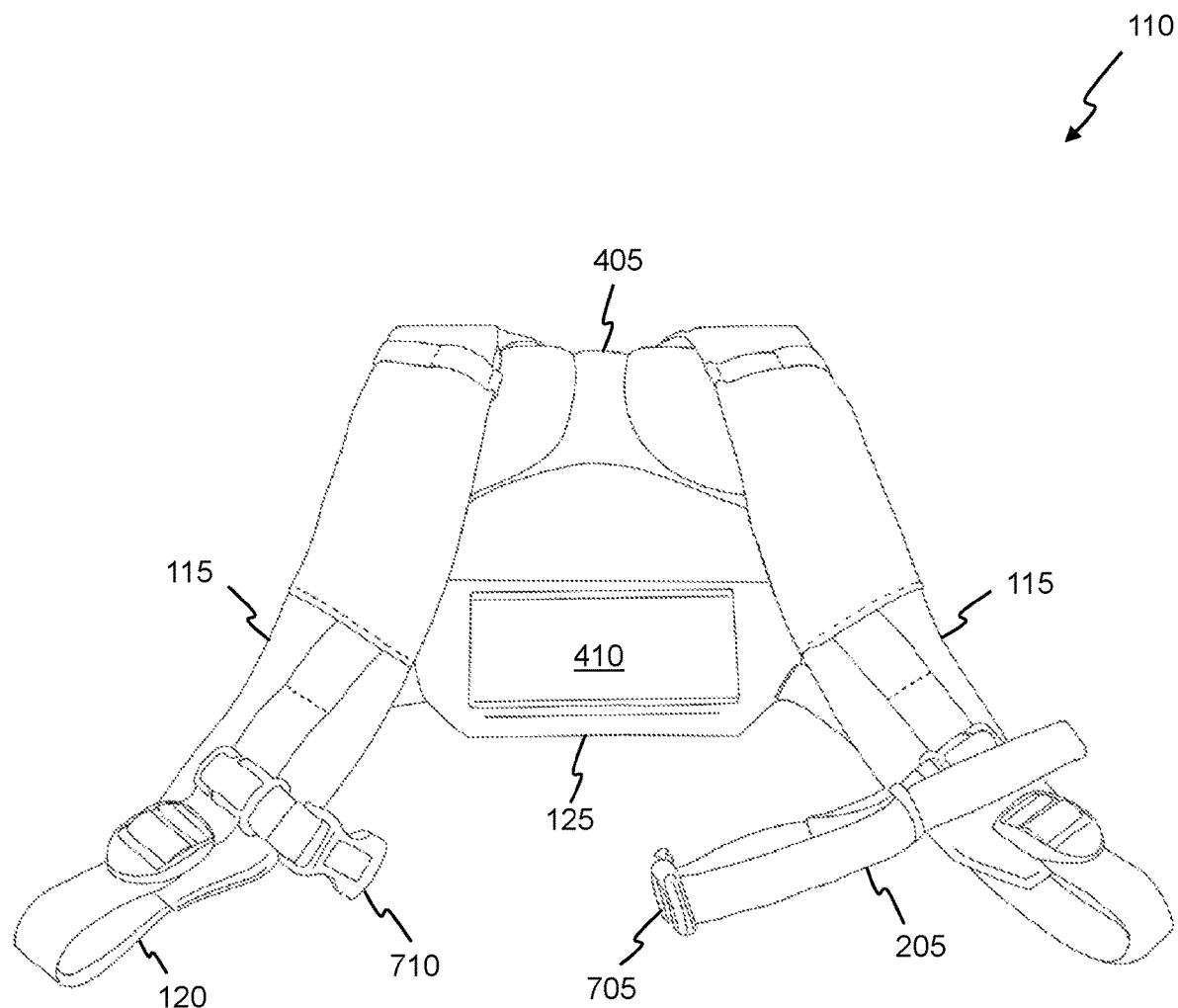
FIG. 7 illustrates a bottom view of the WCN, in accordance with other embodiments.
Figure 8:
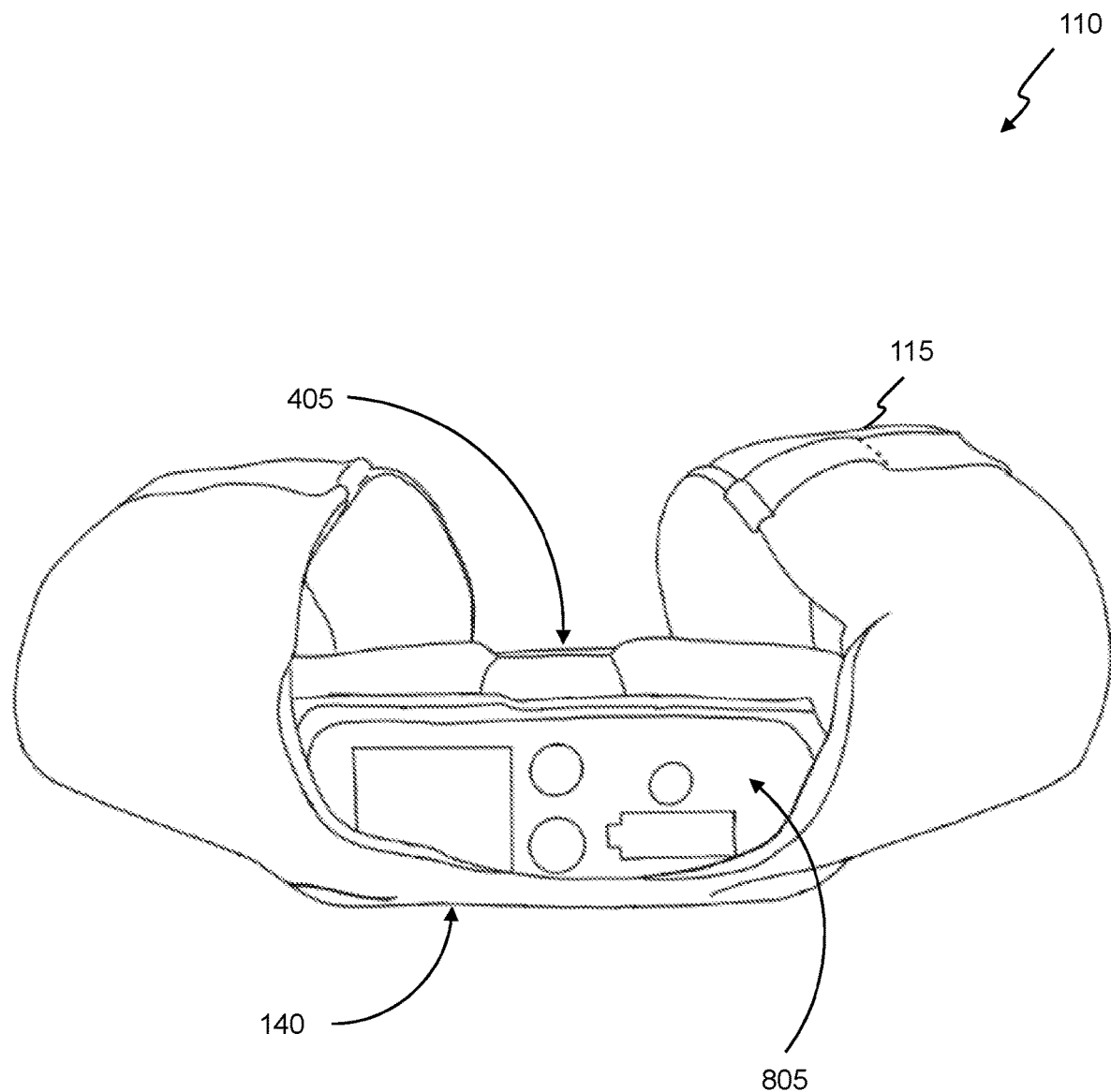
FIG. 8 illustrates a top view of the WCN, in accordance with certain embodiments.
Figure 9:
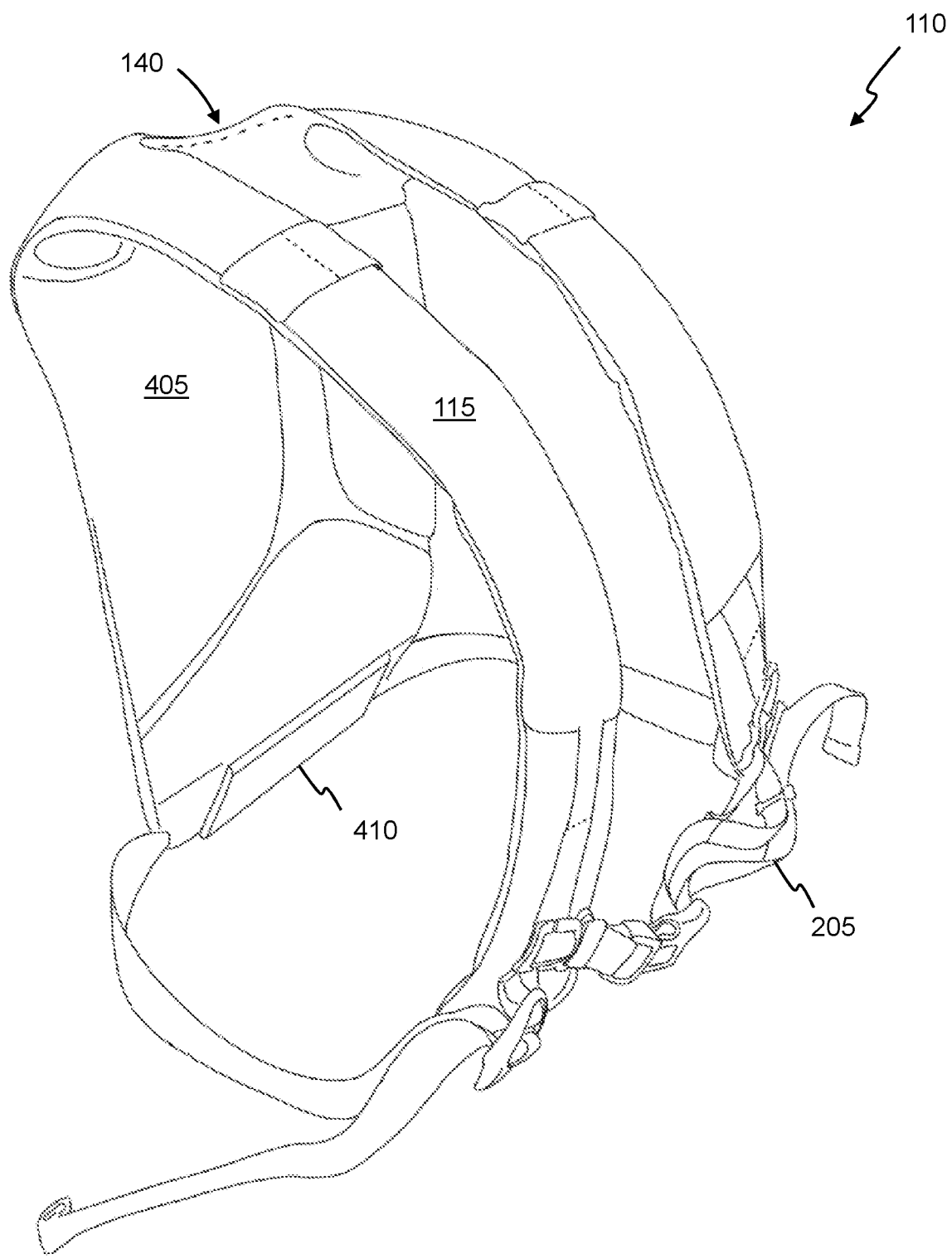
FIG. 9 illustrates a rear perspective view of the WCN, in accordance with yet still other embodiments.
Figure 10:
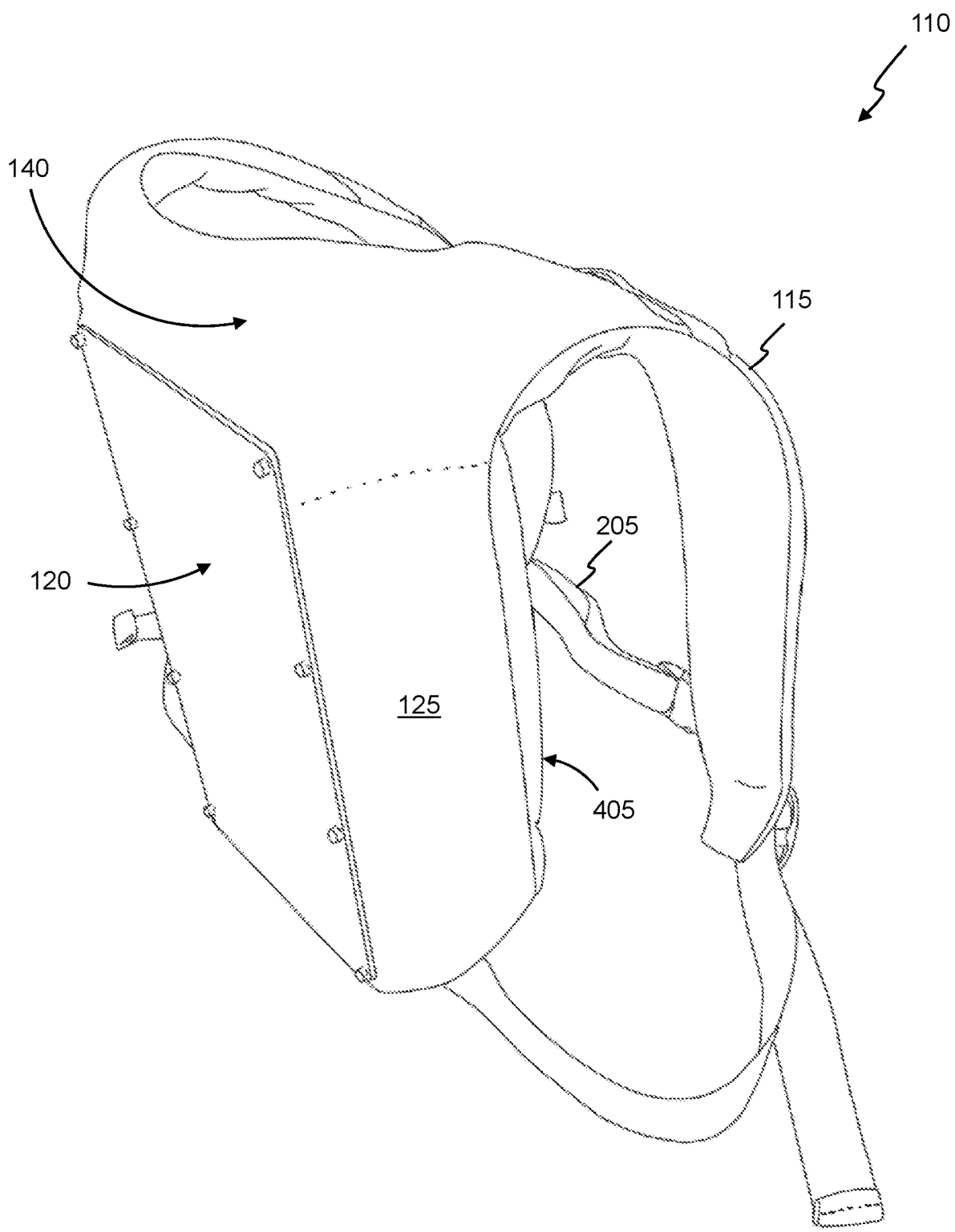
FIG. 10 illustrates a front view of the WCN, in accordance with some embodiments.

In the example illustrated in FIG. 1A, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 1B, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

Hand-held (i.e. portable) communications systems, such as walkie-talkies and other portable radio transceivers, are used by military personnel, law enforcement officials, first responders, as well as civilians. However, such systems typically utilize one or more conspicuous antennas, such as whip antennas, which typically consist of a straight flexible metal wire or rod embedded in polymer material. The bottom end of whip antennas are communicatively coupled to the transceiver of the handheld communications system. Whip antennas are typically designed to be flexible to reduce breaking. However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments. Therefore, a mesh networking wearable communications system with antennas that are not vulnerable to entanglement would be beneficial to consumers.

Embodiments of the present invention will now be described in detail with reference to the Figures. Embodiments of the present invention will now be described in detail with reference to the Figures. FIGS. 1B-10 illustrate a WCN 100 as worn by a user 101 as well as in various views (e.g., front, rear, side, perspective, etc.). Note that for three and two digit reference numbers the first and first two digits, respectively, reflect the Figure in which the element was first depicted. The WCN 100 is a wearable communications device with embedded antenna elements and mesh networking capabilities. As reflected in FIGS. 1B and 2, the WCN 100 includes at least one shoulder strap 115 pivotably attached to an enclosure 125, which allows the WCN 100 to be worn by the user 101. In other words, the WCN 100 is configured to be worn on the torso of the user 101. A shoulder area 102 of the user 101 is also depicted.

The enclosure 125 (and hence, the WCN 100) includes a top area 305 (positioned proximate the neck/head area of the user 101), a bottom area 310 (positioned proximate the lower back area of the user 101), a left side 415, a right side 420, a front panel 130, and a back panel 405. These components as well as the shoulder strap 115 are ideally fabricated using textile materials. A primary requirement of the WCN 100 water-resistance to IP65 or higher. Applicable textile materials should be flexible enough to conform to the contours of the user 101 as well as a housing 1300 and include, but are limited to, water-proof textiles, textiles that can be water-proofed using a chemical solution known in the art, foams, functional textiles (e.g., EMI shielding layers) and similar textile materials. For example, canvas water-proof oxford fabrics, denier, polyester, Cardura 500, and similar waterproof fabrics. To be sure, the bottom area 310 is positioned opposite the top area 304 and the left side 415 is positioned opposite the right side 420.

The front panel 130 and the back panel 405 are peripherally affixed together via bonding (e.g., via polymer adhesive, heat, pressure, other bonding techniques or a combination of two or more thereof), sewing, use of fasteners (e.g., screws, staples, bolts), or a combination of two or more thereof to each other to achieve a protection of IP65 or higher. IP Code or Ingress Protection Code is defined in IEC 60529 which classifies and provides a guideline to the degree of protection provided by mechanical casings and electrical enclosures against intrusion, dust, accidental contact, and water. The first digit indicates the level of protection that the enclosure provides against access to hazardous parts (e.g., electrical conductors, moving parts) and the ingress of solid foreign objects. Here, a level sized "6" indicates no ingress of dust and a complete protection against contact (dust-tight).

The second digit indicates the level of protection that the enclosure provides against harmful ingress of water. Here, level "5" indicates that protection against at least water jets for 1 minute per square meter for at least 3 minutes at a water volume of 12.5 liters per minute and a pressure of 30 kPa (4.4 psi) at a distance of 3 meters (9.8 ft.). The front panel 130 and the back panel 405 are further affixed to a front portion 1605 and a rear portion 1515, respectively, of a housing 1300 (as reflected in FIGS. 13-21 and described in further detail below) via bonding (e.g., via polymer adhesive, heat, pressure, other bonding techniques or a combination of two or more thereof), sewing, use of fasteners (e.g., screws, staples, bolts), or a combination of two or more thereof to each other to achieve a protection of IP65 or higher. The shoulder straps 115 are each pivotably attached proximate to a corner of the enclosure 125. A least one antenna element 106 is affixed to at least one of the enclosure 125 and the shoulder strap 115.

As reflected in FIGS. 2-5 and 8, the enclosure 125 includes an overlap element 140 that horizontally extends between the shoulder straps 115 and vertically extends from the top area 305 and at least partially shields the control panel 805 of a housing 1300 (discussed below) from view when the WCN 110 is worn by the user 101. Specifically, when the shoulder straps 115 are worn on the shoulder of the user 101, the shoulder straps 115 orient the overlap element 140 towards the upper back of the user 101 and thereby help to shield the control panel 805 from the view of others. To be sure, the shoulder strap 115 can include multiple textile layers positioned on each other or simply one textile layer that can maintain structural integrity despite the load of the enclosure 125 that weighs thereon. Alternatively, the shoulder strap 115 can replaced via b-rings, loops, webbing, hook-and-loop, or other attachment points that allow the WCN 110 to be demountably attached to a backpack, plate carrier, or other compatible objects and apparel items. For example, such attachment points can be made of metal, polymers, paracord, elastic, and/or cording.

Figure 11:
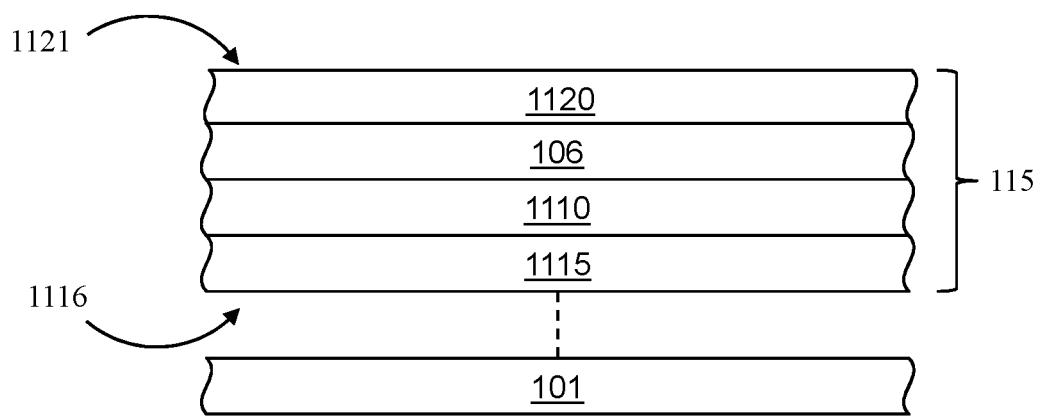
FIG. 11 illustrates a cross-section of a shoulder strap of the WCN positioned near a user, in accordance with other embodiments.

For example, embodiments that include an antenna element 106 positioned in or on the shoulder strap 115, the shoulder strap 115 can include EMI shielding materials (e.g., foils, meshes, foams, conductive textiles) positioned between the user 101 and the antenna element 106 to thereby at least partially shield the user 101 from EM radiation that emanates from the antenna element 106 away from the user surface (i.e. the user 101). FIG. 11 illustrates a cross-section of the shoulder strap 115 positioned near the user 101, in accordance with other embodiments. Here, the shoulder strap 115 includes a plurality of layers; namely, a front strap panel 1120, a rear strap panel 1115, the antenna element 106, and an EMI shielding layer 1110. In embodiments that the shoulder strap 115 does not include an antenna element 106, the shoulder strap 115 can be include just one panel. In certain embodiments, the housing 1300 includes the aforementioned attachment points positioned on its exterior to allow for direct demountable attachment to a backpack, plate carrier, or other compatible objects, structures, and/or apparel items.

The shoulder strap 115 includes a front strap panel 1120 and a rear strap panel 1115 peripherally affixed together to thereby form a layered structure in which the antenna element 106 (and possible additional layers) is positioned. In other words, the antenna element 106 is positioned between the front strap panel 1120 and the rear strap panel 1115. Note the layered structure has a protection of IP65 or higher to ensure protection of the antenna element 106. When the WCN 110 is worn, an external surface 1116 of the rear strap panel 1115 is positioned proximate to and oriented towards the user 101. Similarly, an external surface 1121 of the front strap panel 1120 is oriented away from the user 101. At least the EMI shielding layer 1110 is positioned between the rear strap panel 1115 and the antenna element 106 to thereby reflect EM radiation that emanates from the antenna element 106 away from the user 101. For example, a foam textile layer may also be positioned therebetween to increase user comfort.

Figure 13A:
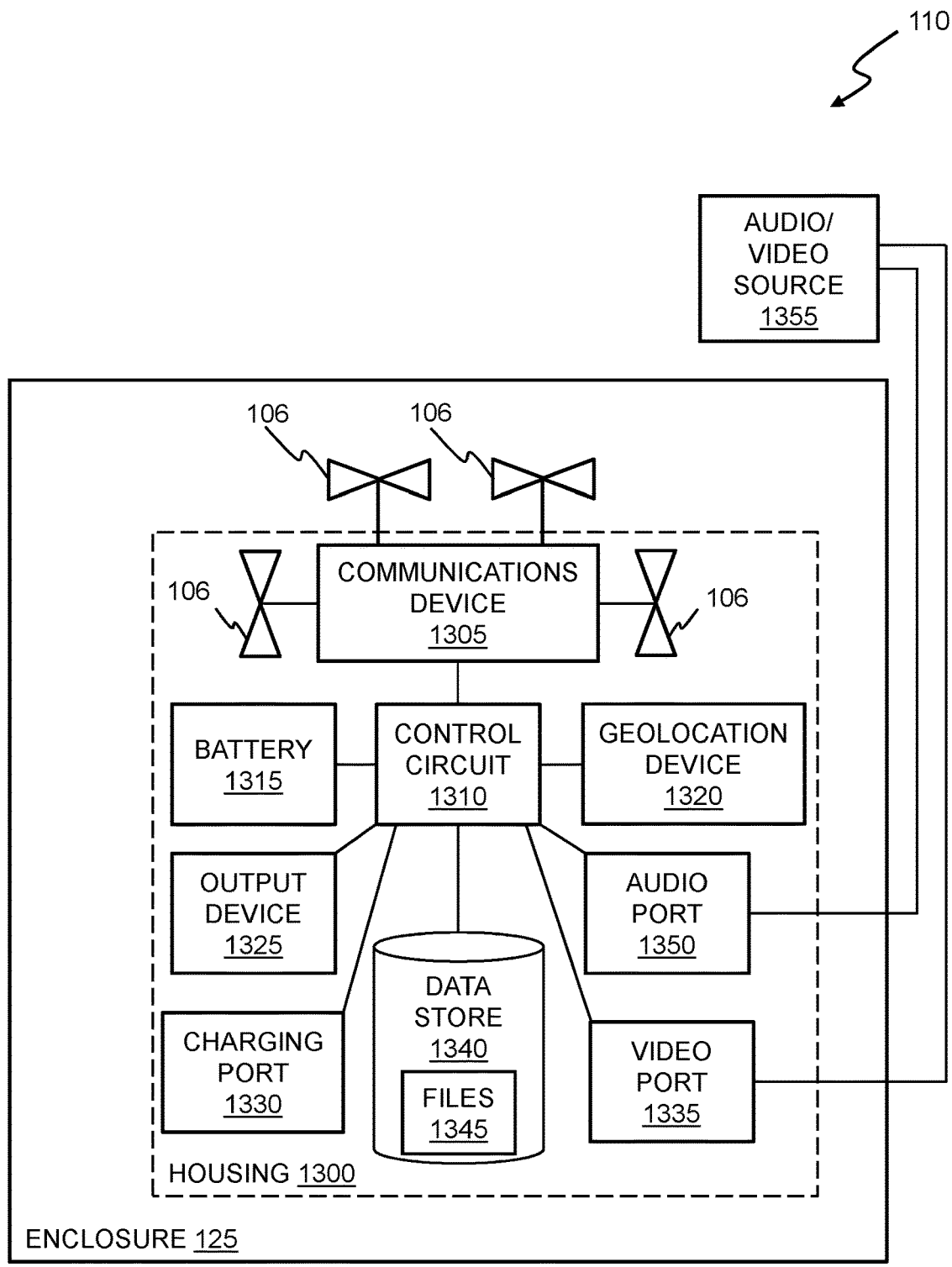
FIG. 13A depicts a block diagram of the WCN, in accordance with yet still other embodiments.

Turning now to the internal electrical components of the WCN 100. FIG. 13 depicts a block diagram of the WCN 100, in accordance with yet still other embodiments. The WCN 100 includes the housing 1300 rigidly affixed (e.g., via bonding, screws, staples, bolts, and/or similar fasteners) within the enclosure 125. The housing 1300 protects the electrical components of the WCN 100 against water, dust, particles to a protection of IP65 or higher. As reflected in FIGS. 14A-16A, the housing 1300 is a rigid and hollow structure (e.g., made of polymer, such as Nylon, PLA, ABS, resin, or other non-electrically conductive thermally stable material) that includes a front portion 1605, a rear portion 1515, a top end 1405, a bottom end 1410, and angular sides 1140. The front portion 1605 is oriented away from and positioned distal to the user 101. The rear portion 1515 is oriented towards and positioned proximate the user 101. The top end 1405 is positioned proximate to a shoulder area of the user 101. The bottom end 1410 is positioned distal to the shoulder area and opposite the top end. The housing 1300 includes an opening 1415 that is positioned on the front portion 1605 that allows access to an internal environment 1420. The housing 130 can be manufactured using additive manufacturing, molding, milling, casting, and similar manufacturing processes. Although the housing 1300 is depicted as a single unit, the housing 1300 can include multiple components that are pieces together to form the final product depicted in the figures.

The internal environment 1420 includes one or more of a charging port 1330, an output device 1325, a battery 1315, a communications device 1305, a geolocation device 1320, an audio port 1350, and a video port 1335 each conductively coupled to a control circuit 1310. To be sure, the control circuit 1310 can be multiple control circuits that work together to perform one or more steps, processes, and/or functions disclosed in the instant application. The control circuit 1310 can be any control circuit known in the art capable of performing one or more steps, processes, and/or functions disclosed in the instant application. Each of the aforementioned components are rigidly affixed within the internal environment 1420 (i.e. the housing 1300). The battery 1315 includes one or more electrochemical cells to generate electrical energy. The battery 1315 can be a primary or a secondary battery. The battery 1315 can be recharged via connecting an external power source to the WCN 100 via the charging port 1330.

The charging port 1330 is a physical connector known in the art that mates with another connector (usually a type of plug on the end of a cable) to electrically connect the WCN 100 to an external power source (e.g., an electrical outlet, portable electric generator, battery pack, and similar external power sources known in the art). In certain embodiments, the WCN 100 includes an inductive charging element to facilitate wireless power transfer. The control panel 1430 is a flat area that includes control instruments and interface elements. Although the control panel 1430 is depicted as positioned on or proximate to the top end 1405, the component can be positioned at or proximate to other locations on the housing 1300 (e.g., the side or the bottom end 1410. The control panel 1430 allows access to an output device 1325a (e.g., a battery power indicator LED), an output device 1325b (e.g., a network status indicator LED), the audio port 1350, the video port 1335, the charging port 1330, and a power switch 1905. Note, the battery power indicator LED can convey the percentage of power that remains in the battery (e.g., 10%, 25%, etc.) and/or a low power status.

The communications device 1305 is a computing device that wirelessly transmits and receives information (i.e. data) using a wireless communications protocol known in the art or compatible with an embodiment of the instant disclosure. In other words, the communications device 1305 allows the WCN 110 to establish a communications network (e.g., a mesh communications network) with one or more other devices (e.g., the WCNs 110 as well as other communications devices with and/or without mesh networking capabilities). In certain embodiments, the communications device 1305 includes a plurality of devices that work together to perform one or more communications tasks disclosed in the instant application. The communications device 1305 is conductively coupled to and preferably communicates via one or more antenna elements 106 (e.g., send and/or receive data modulated via one or more communications protocols known in the art).

The communications device 1306 can communicate via one or more communication protocols known in the art (or compatible therewith) that include, but are not limited to, UHF, VHF, Long-Term Evolution ("LTE"), 3G, standards based on GSM/EDGE and/or UMTS/HSPA, Wi-Fi, IEEE 802.11 standards, General Packet Radio Service ("GPRS"), local area networking ("LAN") protocols, ("WAN") wide area networking protocols, Bluetooth®, microwave, and similar wireless communications protocols. The control circuit 1310 is configured to establish, via the communications device 1306, a self-organizing local wide area network ("LAN") with a plurality of computing devices (e.g., other WCN 110 as well as other communications devices) that each connects directly, dynamically, and non-hierarchically to the LAN (i.e., establish a mesh network).

The antenna element 106 is an electrically conductive object that is utilized via the communications device 1305 to wirelessly transmit and receive information (i.e. radio waves), according to preferred embodiments. The antenna element 106 preferably substantially conforms to the contours of the torso of the user 101. In order to do so, the antenna element 106 is preferably a planar, flexible, and bendable structure that has a reduced visual signature (e.g., less than 2 mm thick). The antenna element 106 can be an antenna array (e.g., a plurality of antenna elements 106 interconnected to work together as a single antenna to transmit or receive radio waves). For example, the antenna array can be configured as a phased array to enable directional RF signal transmission or reception. The antenna element 106 is formed (e.g., via printing, molding, coating, and similar deposition techniques) using a conductive composition that includes a polymer(s) and fully exfoliated single sheets of graphene.

The fully exfoliated single sheets of graphene preferably form a three-dimensional percolated network within the polymer(s), which yields superior conductivity for the composition compared to un-percolated compositions that may rely more on the conductivity of the polymer and/or an electrically conductive addictive. The fully exfoliated single sheets of graphene are separated on a nanoscale within the polymer(s). The fully exfoliated single sheets of graphene are about 1 nm thick and substantially planar. In certain embodiments, the fully exfoliated single sheets of graphene have surface imperfection (i.e. "wrinkles" or "kinks") resulting from the presence of lattice defects in, or by chemical functionalization of the two-dimensional hexagonal lattice structure of the basal plane. Applicable polymers include, but are not limited to, polyethylene terephthalate, acrylic, rayon, aramid, modacrylic, spandex, nylon, olefin, polyester, saran, sulfur, polypropylene, polyethylene, elastane, and similar polymers.

In preferred embodiments, the fully exfoliated graphene sheets (i.e. the graphene sheets) as well as the conductive composition are generated as disclosed in U.S. Pat. No. 7,658,901 B2 by Prud'Homme et al; U.S. Pat. No. 8,278,757 B2 by Crain; US Patent Pub. No. 2011/0189452 A1 by Lettow et al.; and US Patent Pub. No. 2014/0050903 A1 by Lettow et al., which are each hereby incorporated by reference in their entirety. The fully exfoliated graphene sheets preferably have a surface area of about 2,630 $m^2/g$ to promote a low percolation threshold of, for example, 0.52 vol. %. To be sure, neither carbon nanotubes (e.g., SWCNT or MWCNT) nor graphite are substitutions of the aforementioned fully exfoliated graphene sheets due the different inherit structural, electrical, and mechanical properties of the materials. For example, the fully exfoliated graphene sheets have a platy (e.g., two-dimensional) structure as opposed to the three-dimensional structure of carbon nanotubes and graphite, which results in higher percolation thresholds.

In other embodiments, the WCN 110 transmits its location data to at least one other WCN 110 in the network. The geolocation device 1320 is a computing device that is capable of receiving information from one or more satellite navigation systems and then calculate the geographical position of the WCN 110. Using suitable software the geolocation device 1320 may communicate the position on an output device (e.g., the output device 1325) and it may offer routing directions. The output device 1325 is computer hardware known in the art that communicates information (e.g., stored in the files 1345, received and/or generated via the communications device 1305 or the geolocation device 1320) into a human-perceptible form (e.g., text, graphics, tactile, audio, or video). The output device 1325 is at least partially externally positioned on the enclosure to be viewable by the user without necessitating the user to open the housing 1300 to access the internal environment 1420 (e.g., the control panel).

Figure 13B:
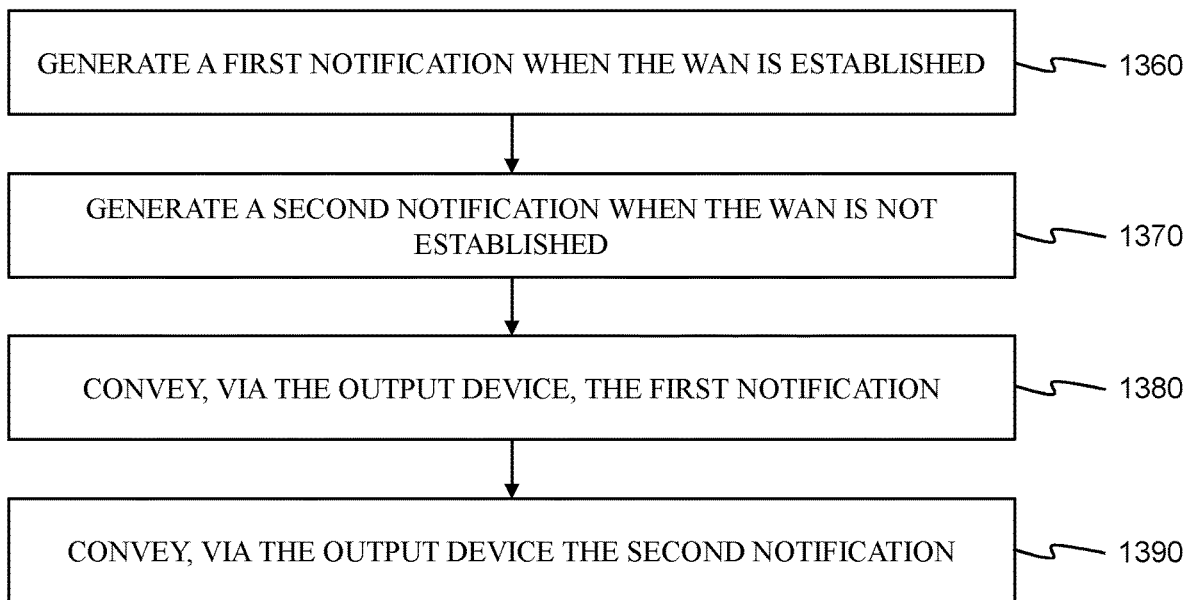
FIG. 13B illustrates the operational of the WCN to generate and convey notifications, in accordance with some embodiments.
Figure 14A:
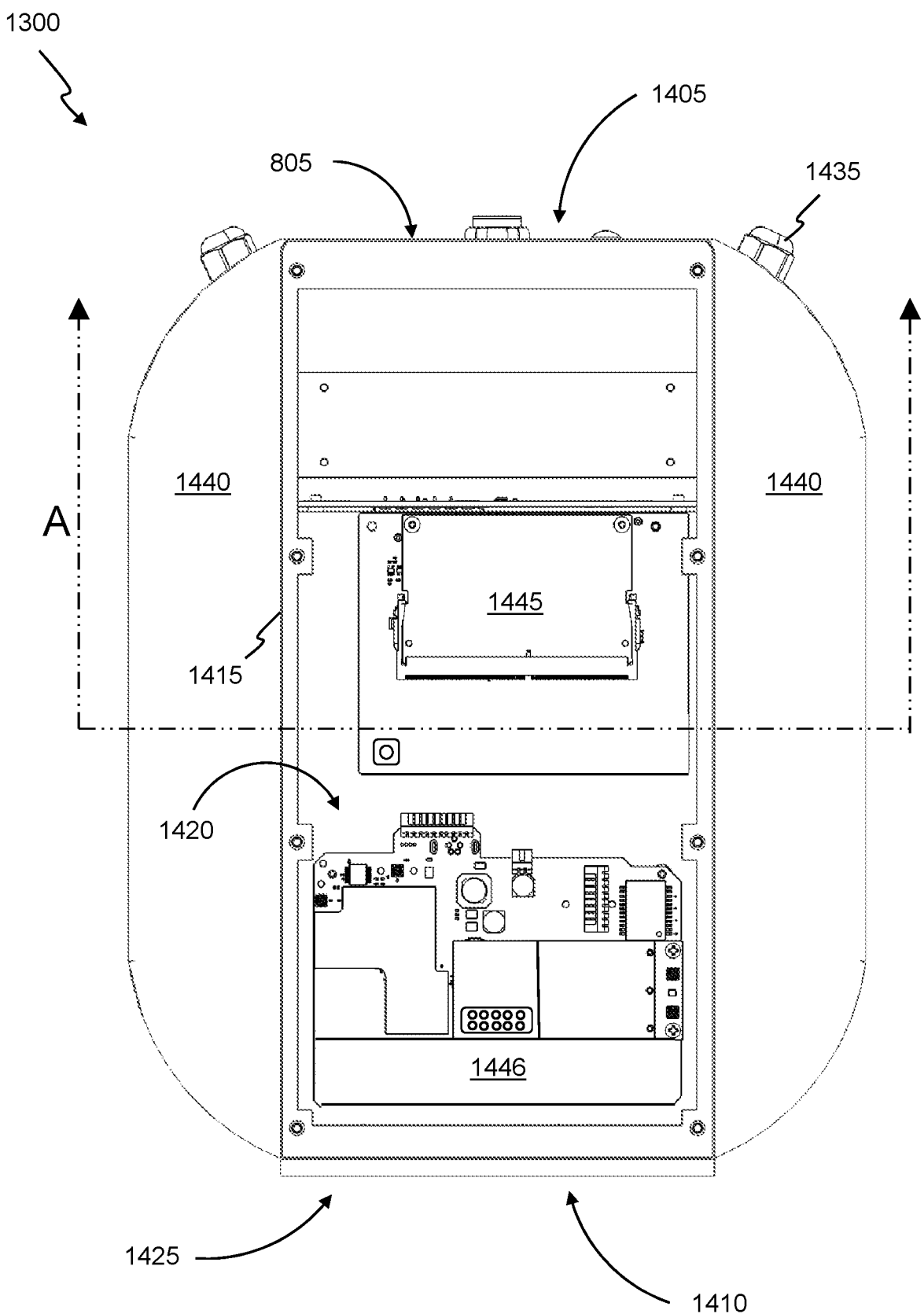
FIG. 14A illustrates a front view of a housing of the WCN, in accordance with some embodiments.
Figure 14B:
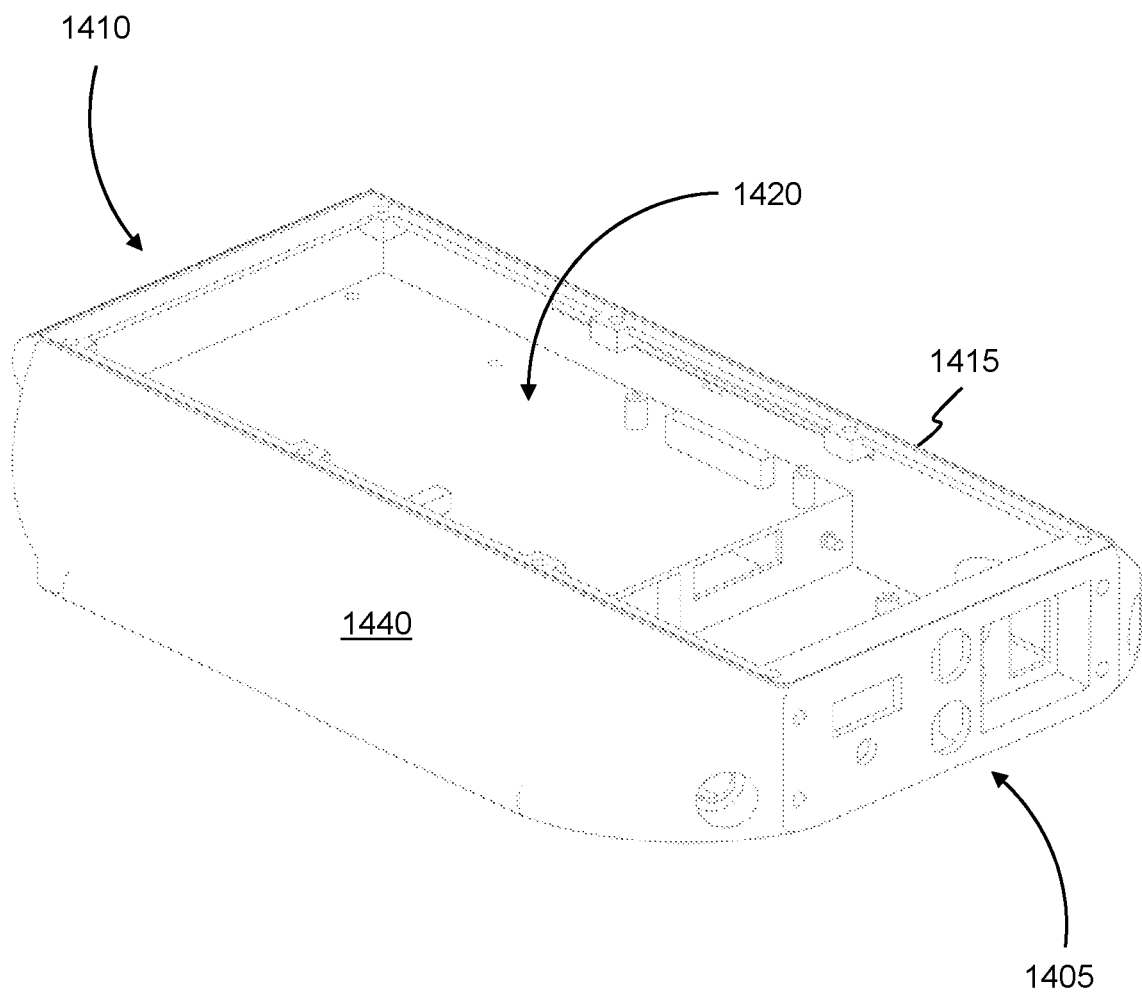
FIG. 14B illustrates a perspective view of the housing, in accordance with other embodiments.
Figure 15:
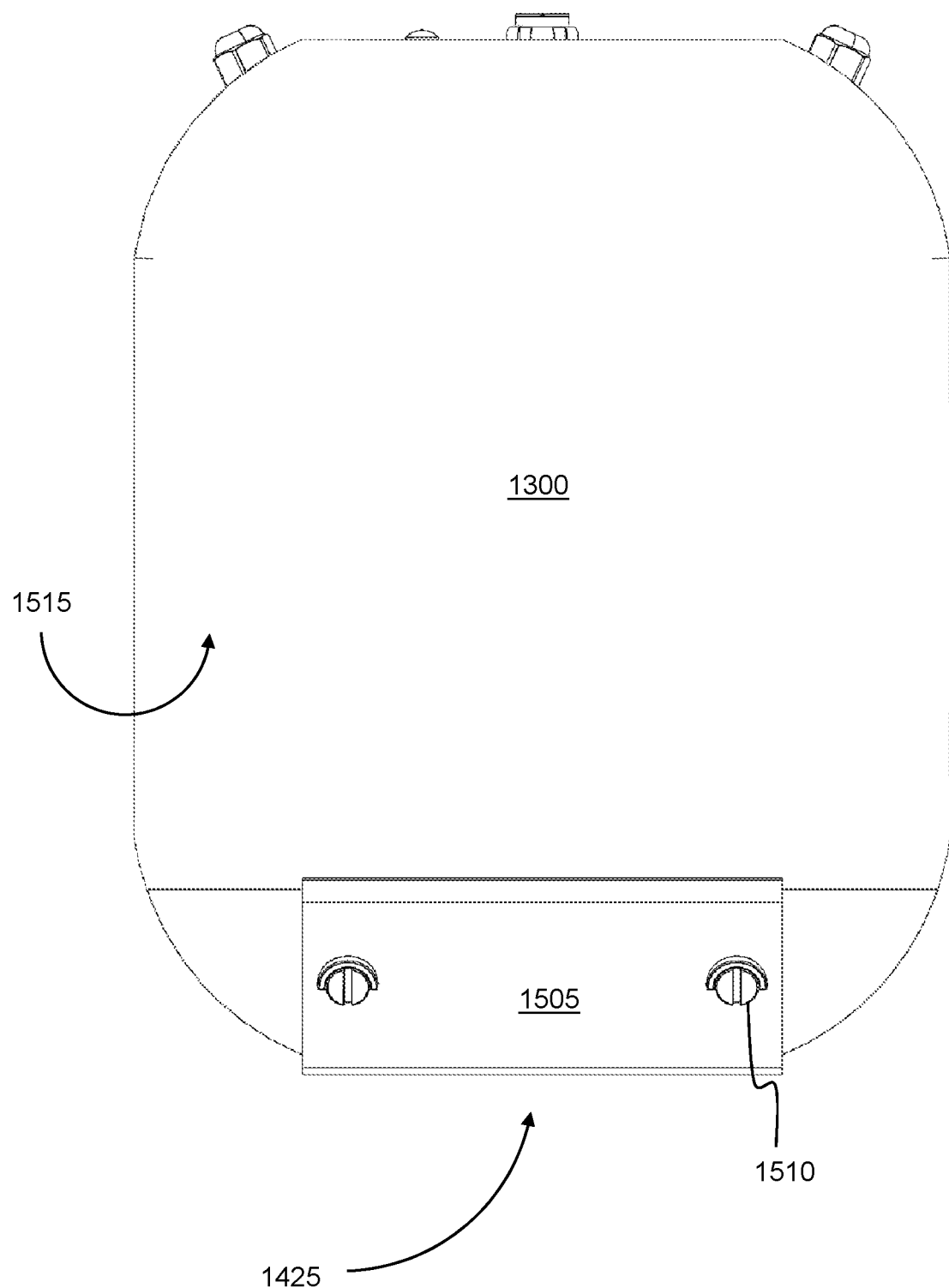
FIG. 15 illustrates a rear portion of the housing, in accordance with other embodiments.

When present, the output device 1325 is communicatively coupled to the control circuit 1310. For example, to operate in extreme conditions (e.g., environments having abnormal temperatures and/or increase probability of physical impact events), the output device 1325 can be a light-emitting diode (LED), which have a low power consumption requirements, long lifetimes, and enhanced physical robustness, and a small footprint. The output device 1325 can be used to convey to the user whether the WCN 110 successfully networked with another copy of the WCN 110. FIG. 13B illustrates the operational steps of the WCN 110 to generate and convey notifications, in accordance with some embodiments. For example, the user 101 activates the WCN 110 and attempts to establish a network (e.g., WAN, wireless mesh network, or similar communications topology) with a computing device (e.g., a WCN 110). At Step 1360, a first notification is generated when the WAN is established.

At Step 1370, a second notification is generated when the WAN is not established. At Step 1380, the first notification is conveyed via the output device 1305. For example, the output device 1325 can be a multicolored light-emitting diode (LED), which is activated to display a first color (e.g., green) to convey that the WAN is established. At Step 1390, the second notification is conveyed via the output device 1305. For example, the output device 1325 can be activated to display a second color (e.g., red) to convey that the WAN is not established.

In certain embodiments, the WCN 110 includes a data store 1340 communicatively coupled to the control circuit 1310 that includes a files 1345. Information generated and/or received via the communications device 1305 and/or the geolocation 1320 can be stored in files 1345. To be sure, the data store 1340 is a repository known in the art (or compatible therewith) for persistently storing and managing collections of data which include repositories (e.g., databases and similar data structures) as well as simpler data store types (e.g., simple files, emails etc.).

An audio port 1350 and/or a video port 1335 can be conductively coupled to the control circuit 1310. The audio port 1350 and the video port 1335 are electrical or optical connectors known in the art for carrying audio and video signals, respectively, received from an audio/video source 1355 (e.g., a handheld radio, video camera, computing device that generates audio and/or video signals, communications devices that generates audio and/or video signals, etc.).

Figure 16A:
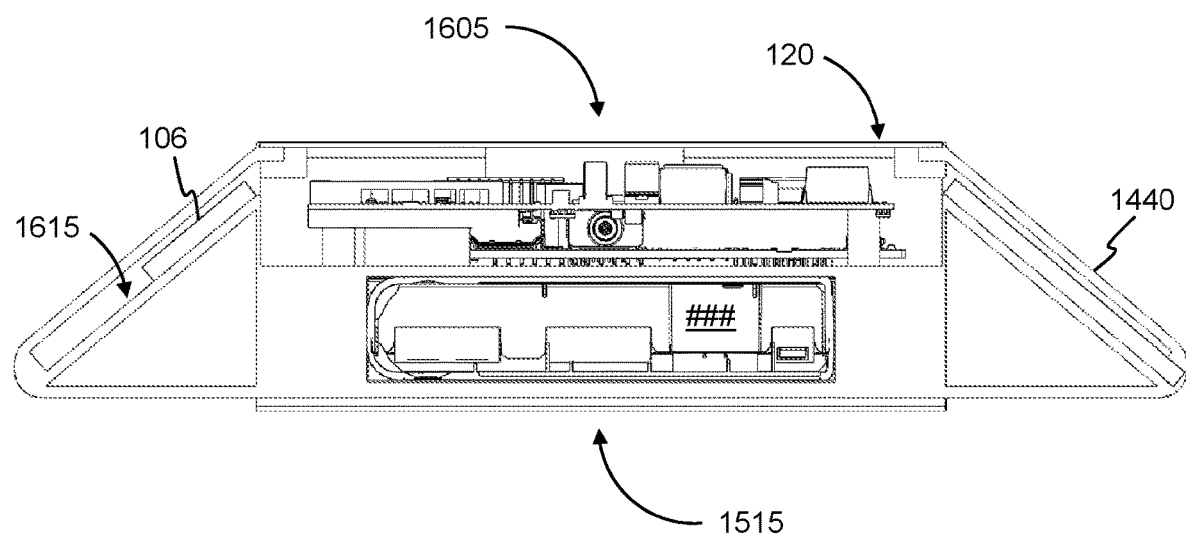
FIG. 16A illustrates a cut-through view of the housing, View A of FIG. 14A, in accordance with certain embodiments.
Figure 16B:
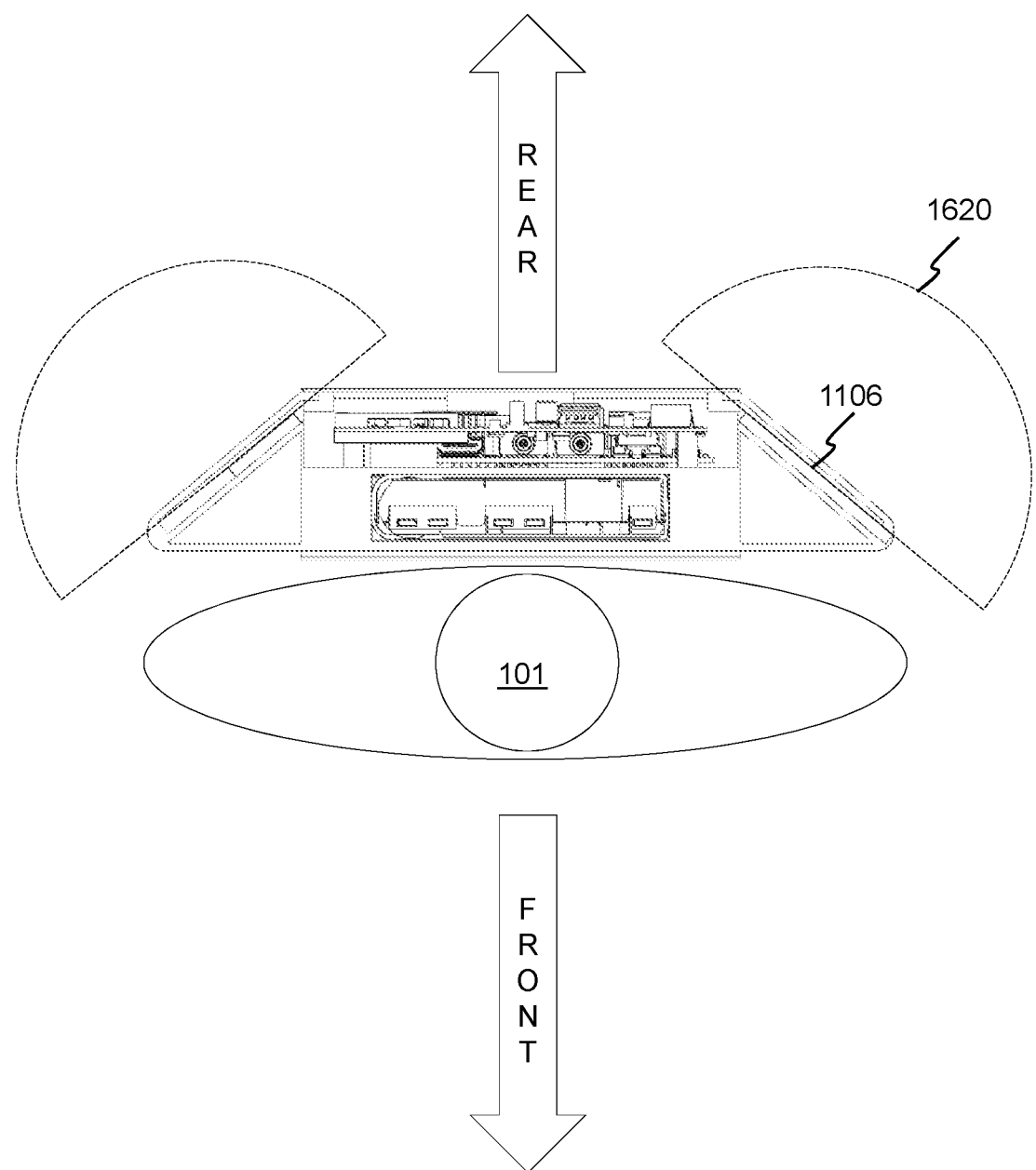
FIG. 16B illustrates a top view of a user wearing the WCN 110 on their back and the associated RF radiation pattern associated with antenna elements that are angularly positioned relative to each other, in accordance with yet still other embodiments.
Figure 16C:
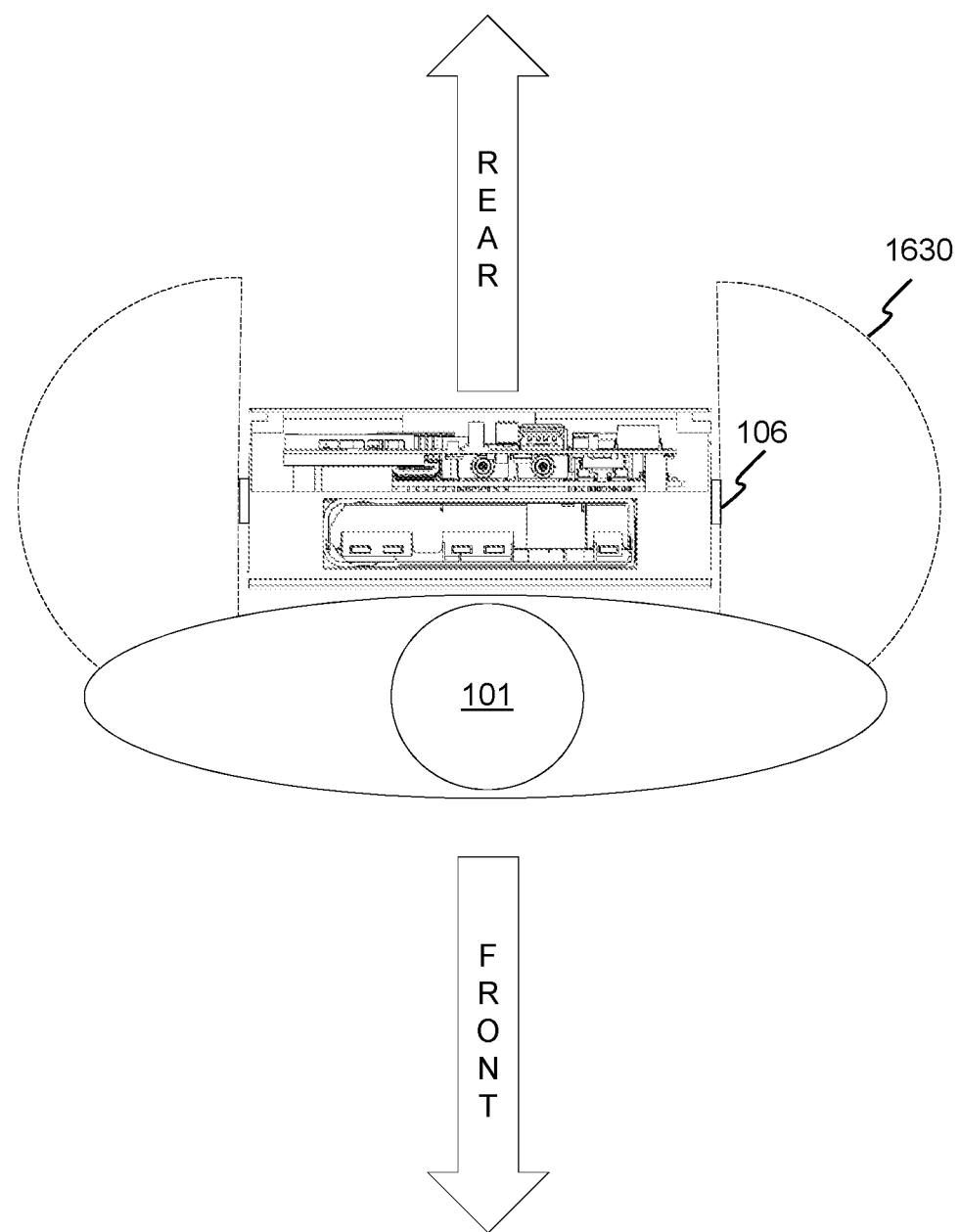
FIG. 16C illustrates a top view of the user wearing the WCN 110 on their back and the associated RF radiation pattern associated with antenna elements that are parallelly positioned relative to each other, in accordance with yet still other embodiments.
Figure 17:
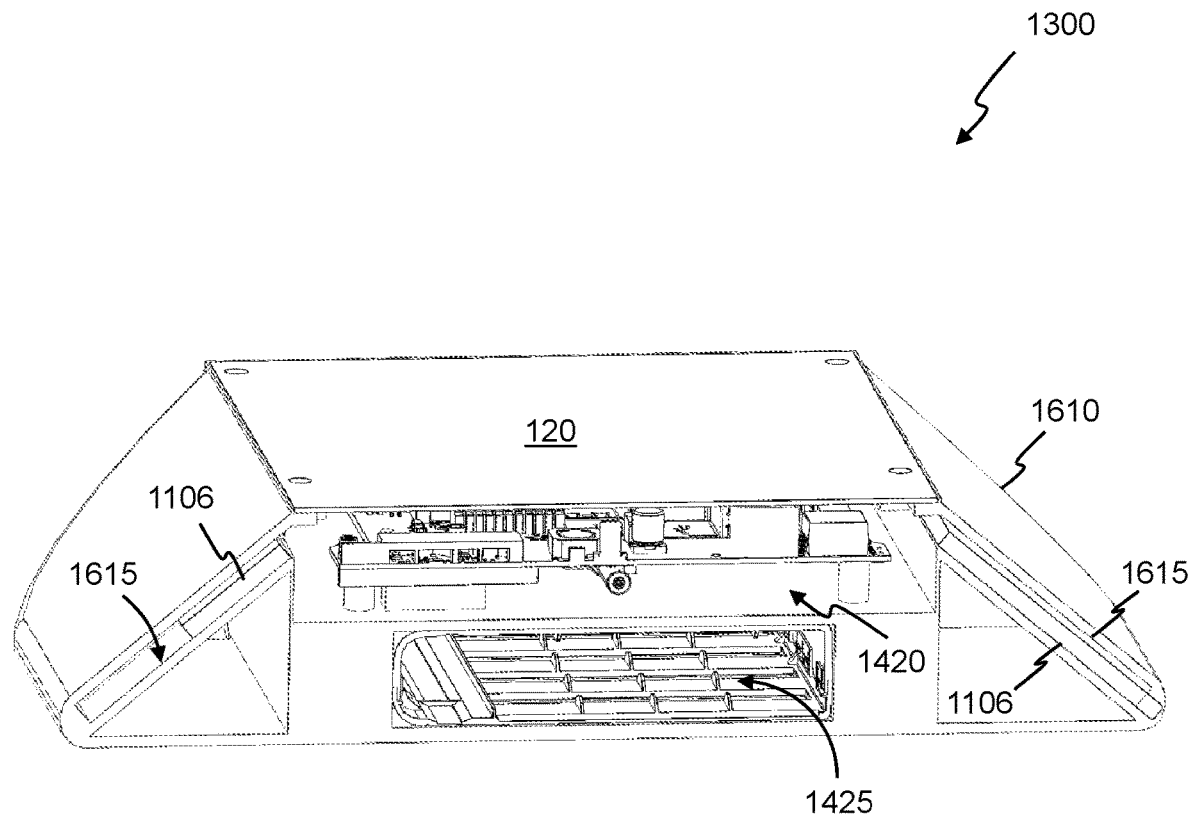
FIG. 17 illustrates a perspective view of the View A, in accordance with yet still other embodiments.
Figure 18:
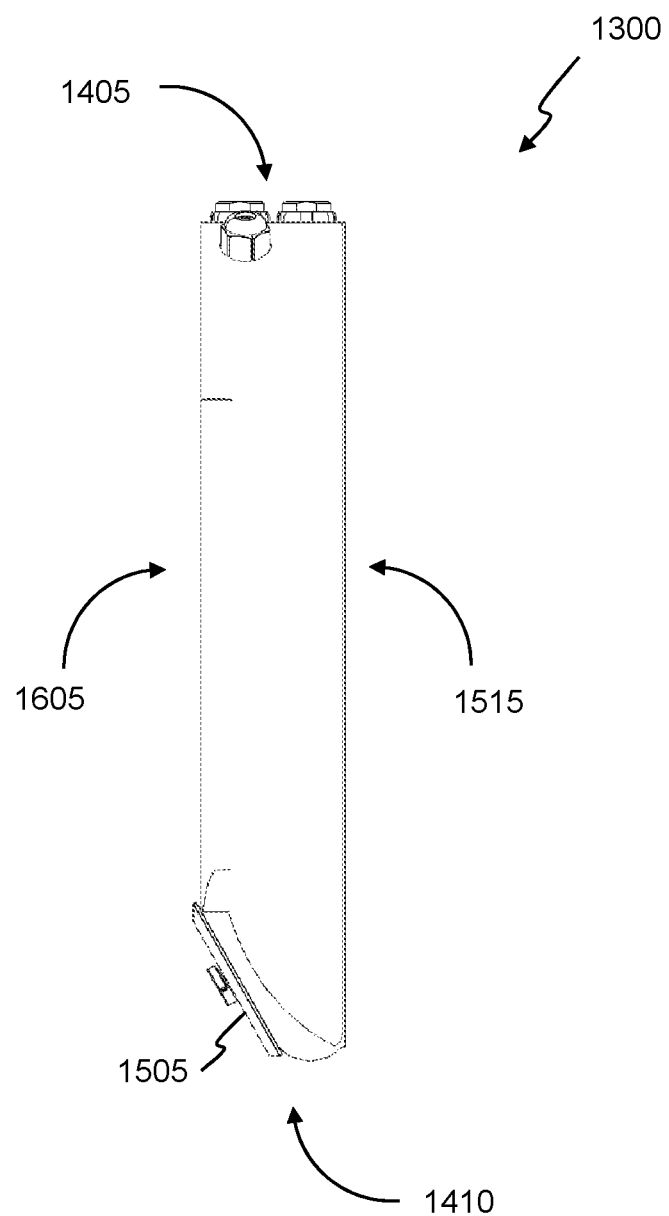
FIG. 18 illustrates a side view of the housing, in accordance with some embodiments.
Figure 19:
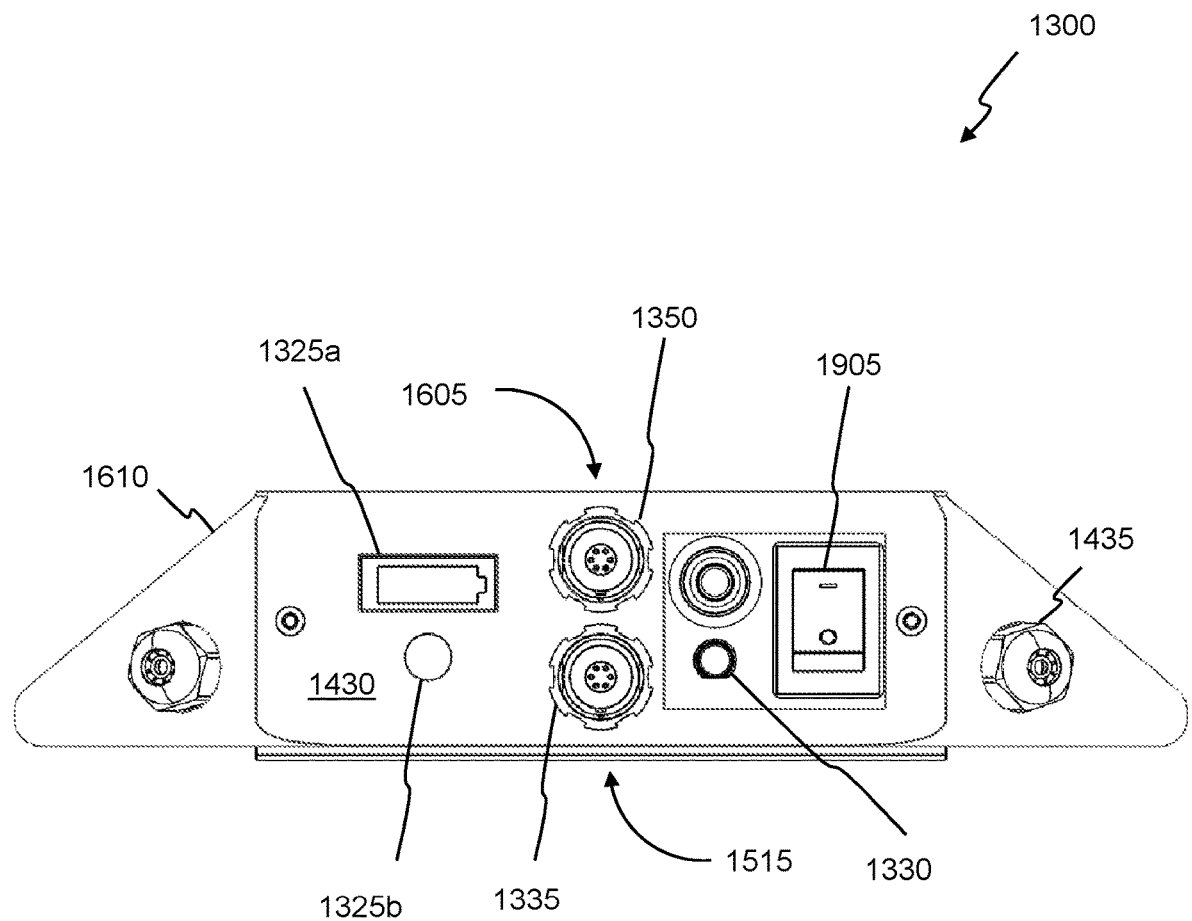
FIG. 19 illustrates a top view of the housing, in accordance with other embodiments.
Figure 20:
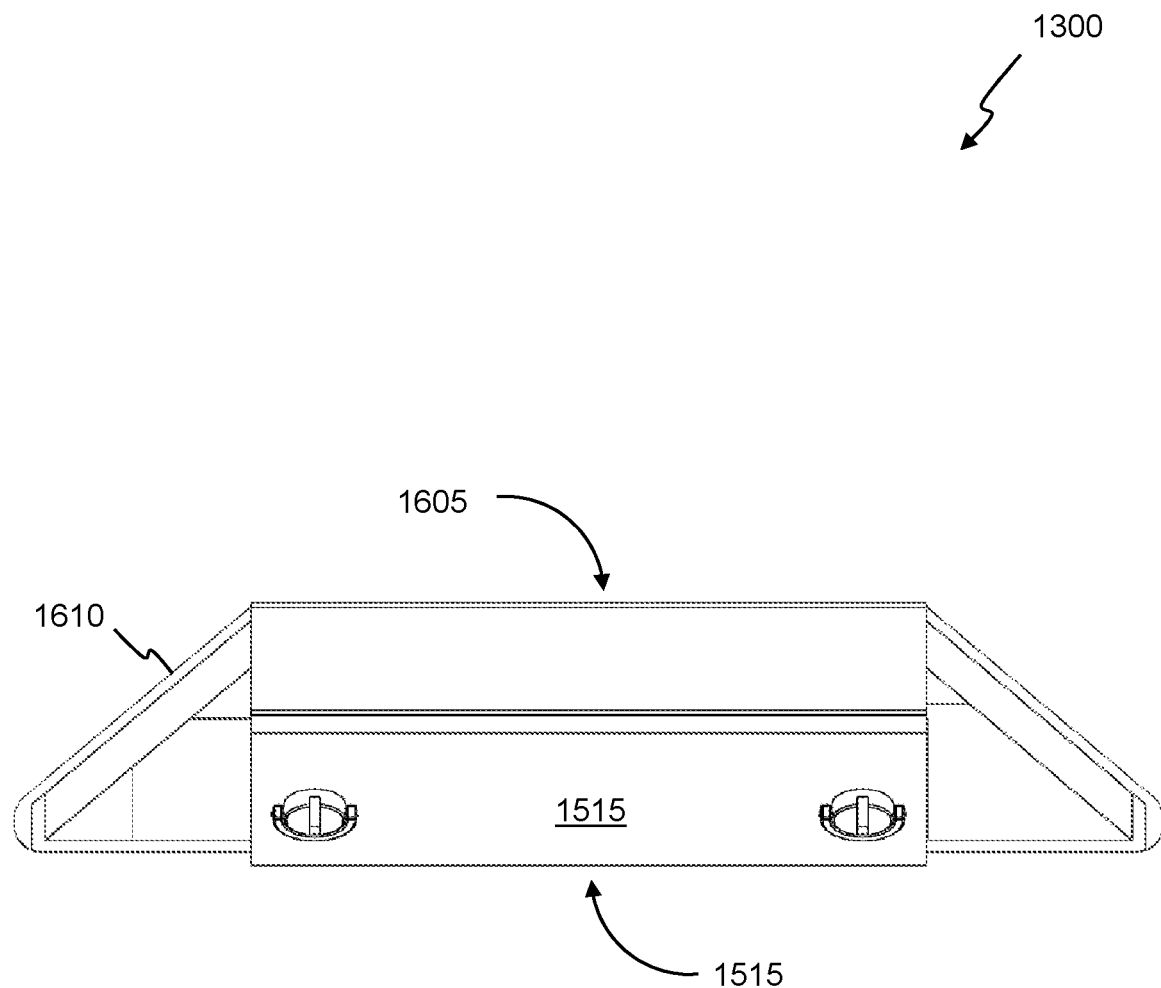
FIG. 20 illustrates a bottom view of the housing, in accordance with certain embodiments.
Figure 21:
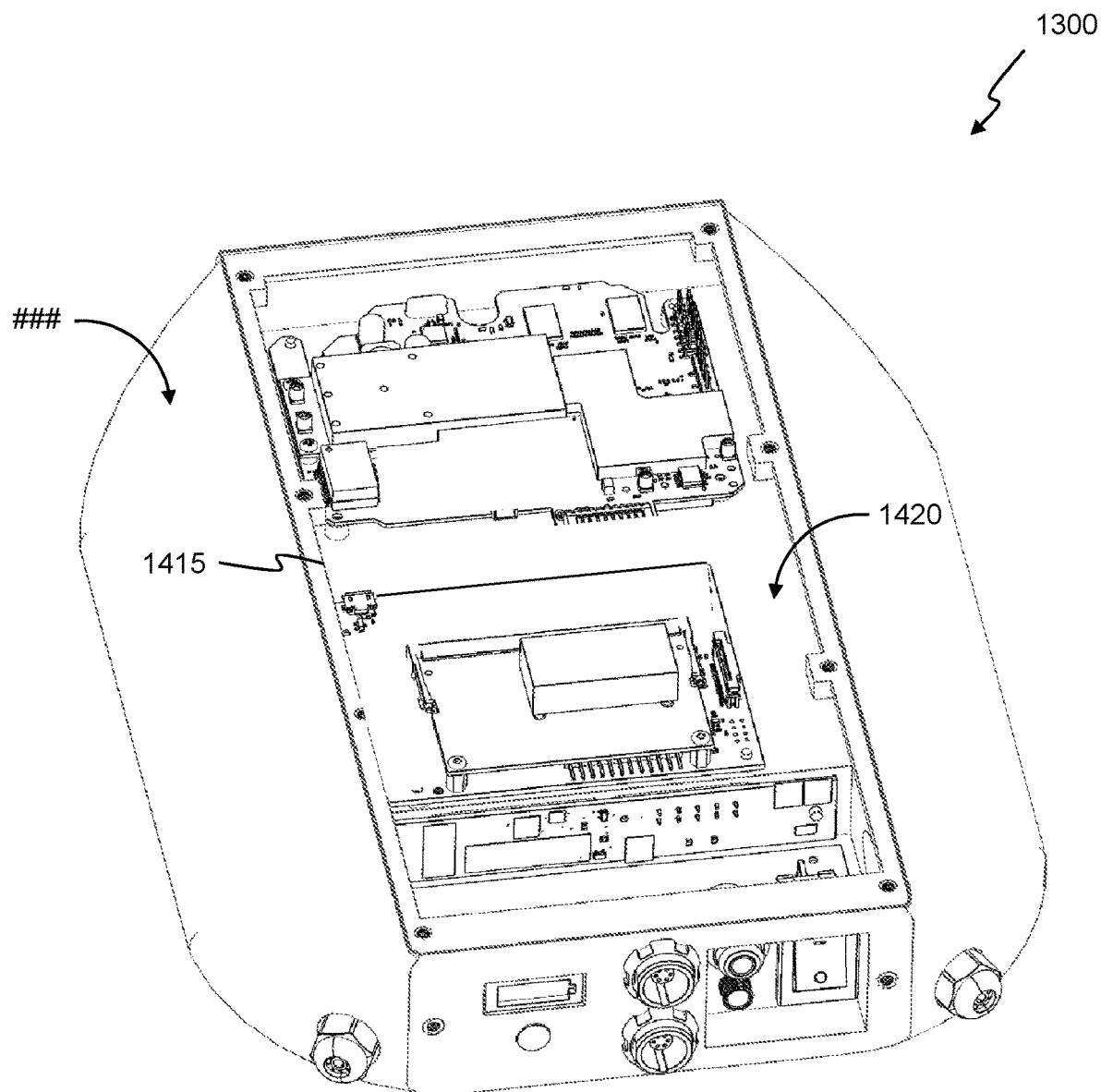
FIG. 21 illustrates a perspective view of the front portion of the housing, in accordance with yet still other embodiments.
Figure 22:
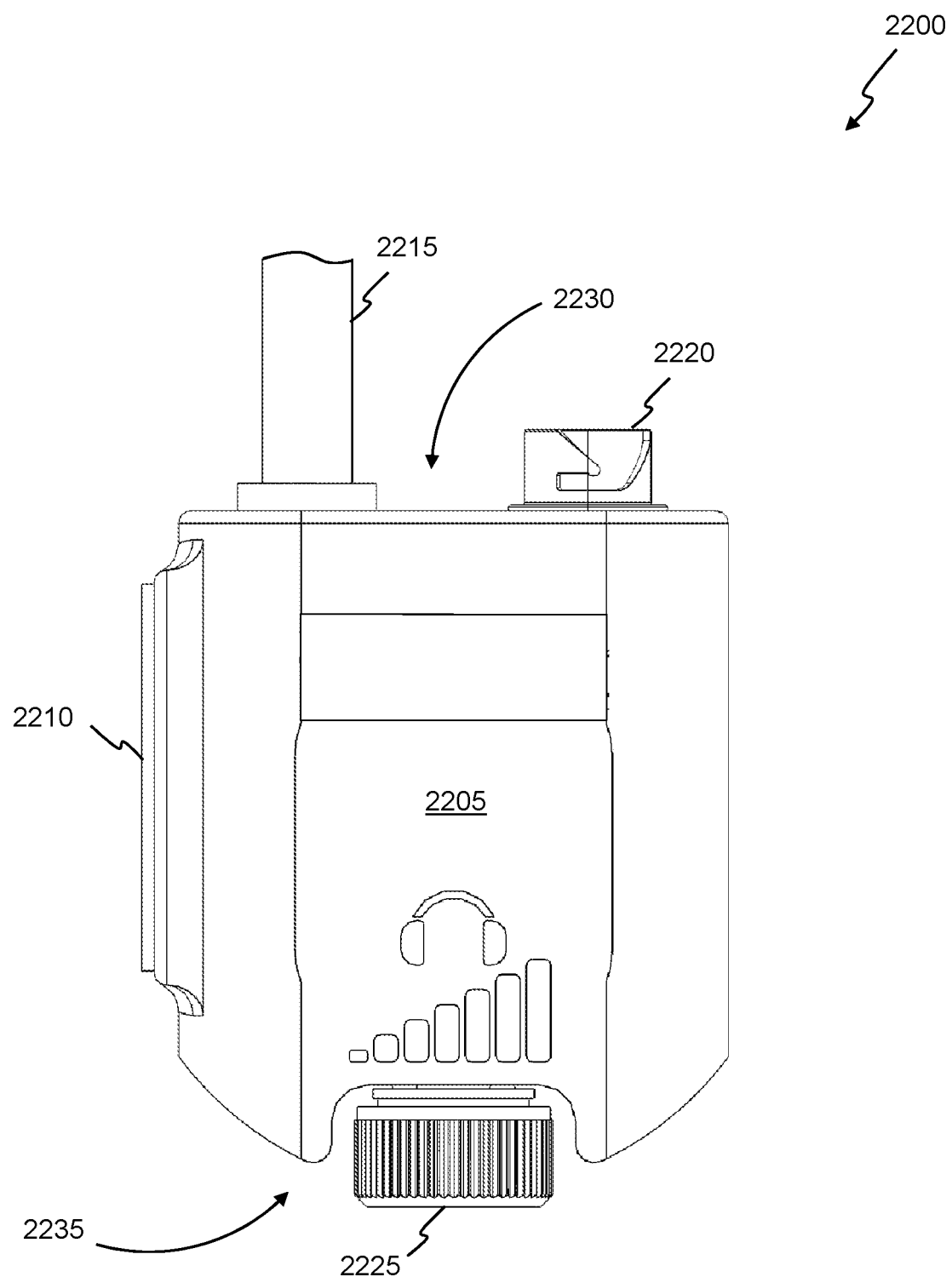
FIG. 22 illustrates a front view of an audio hub, in accordance with some embodiments.
Figure 23:
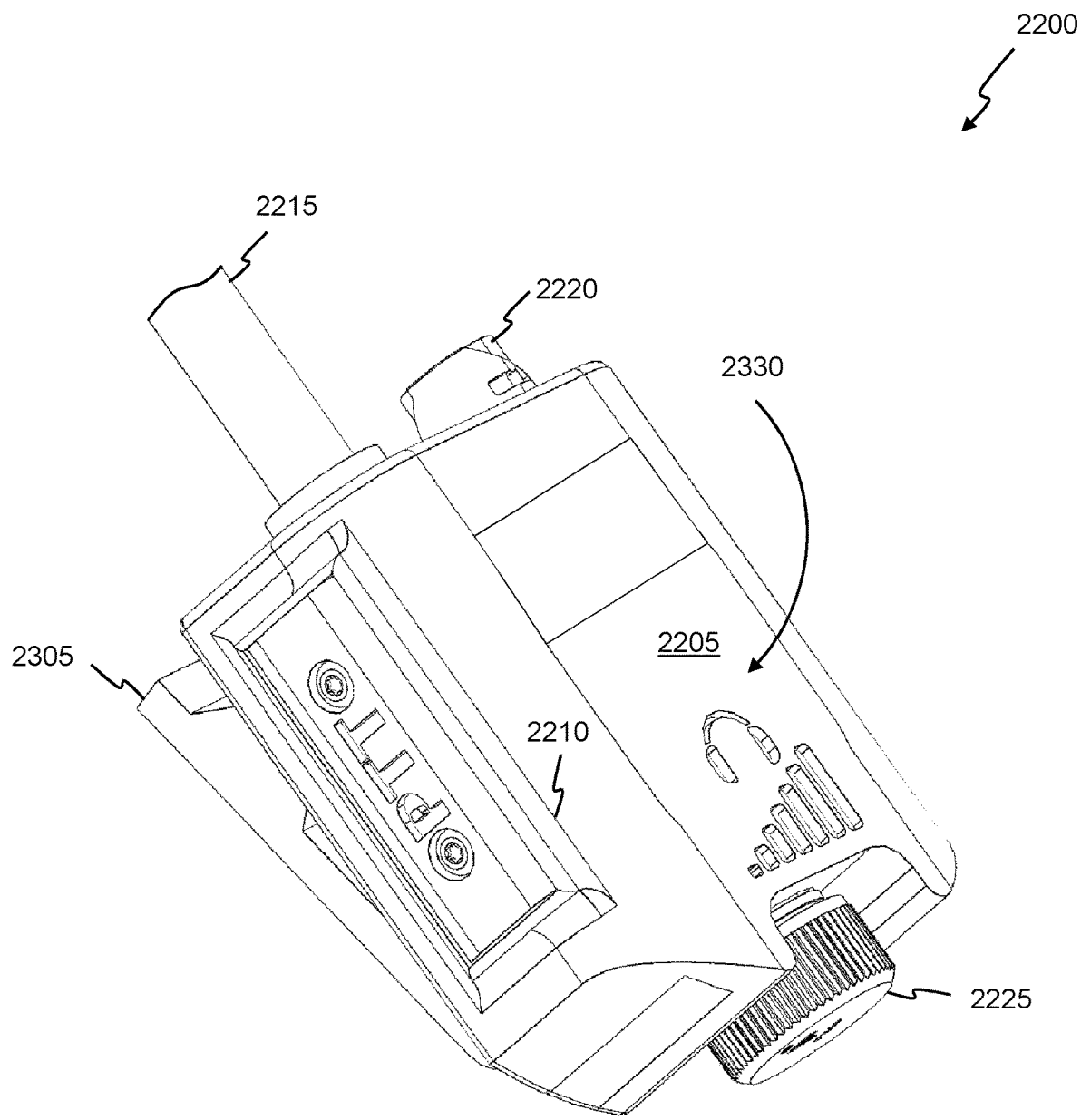
FIG. 23 illustrates a left perspective view of the audio hub, in accordance with other embodiments.
Figure 24:
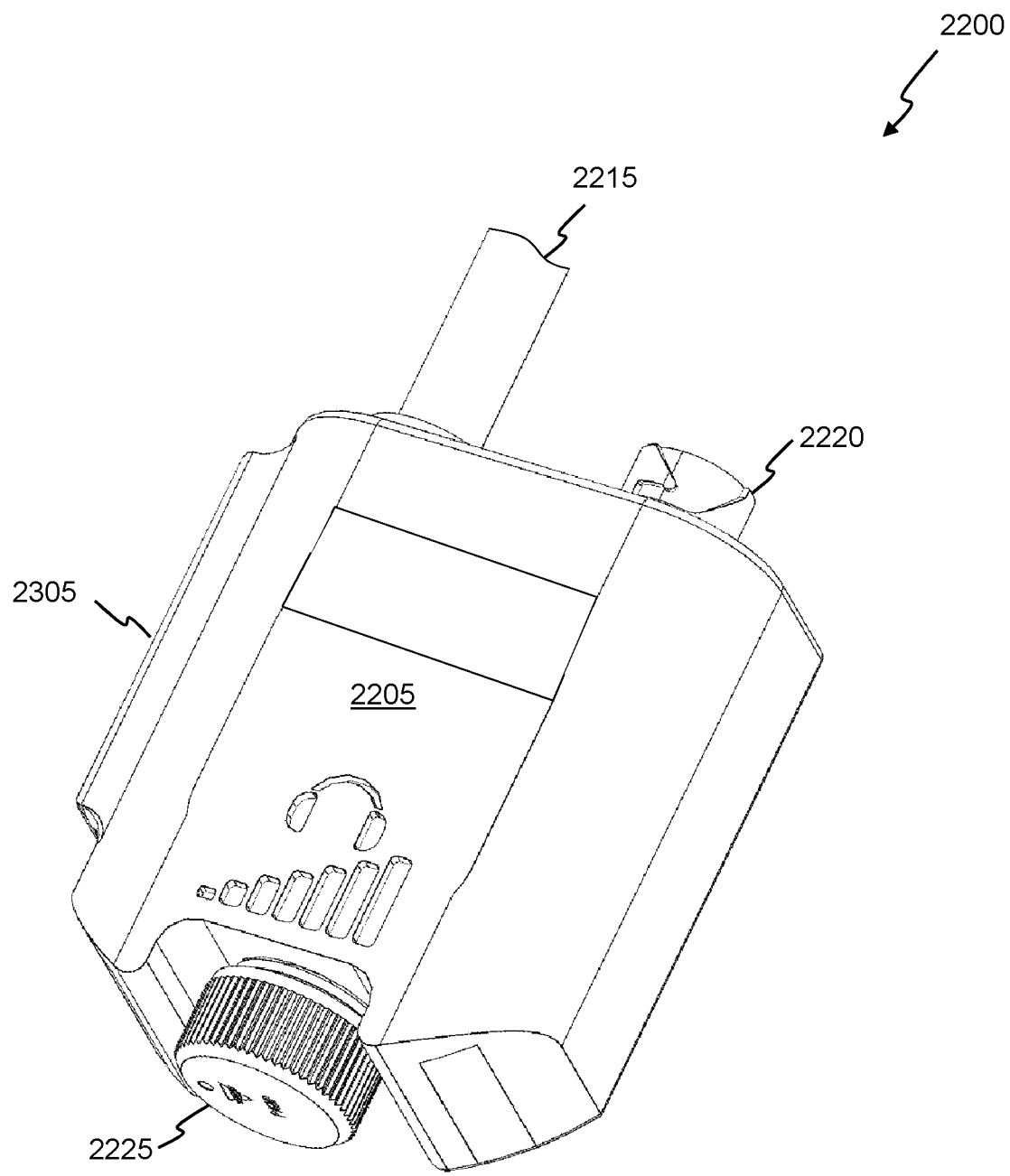
FIG. 24 illustrates a right perspective view of the audio hub, in accordance with certain embodiments.
Figure 25:
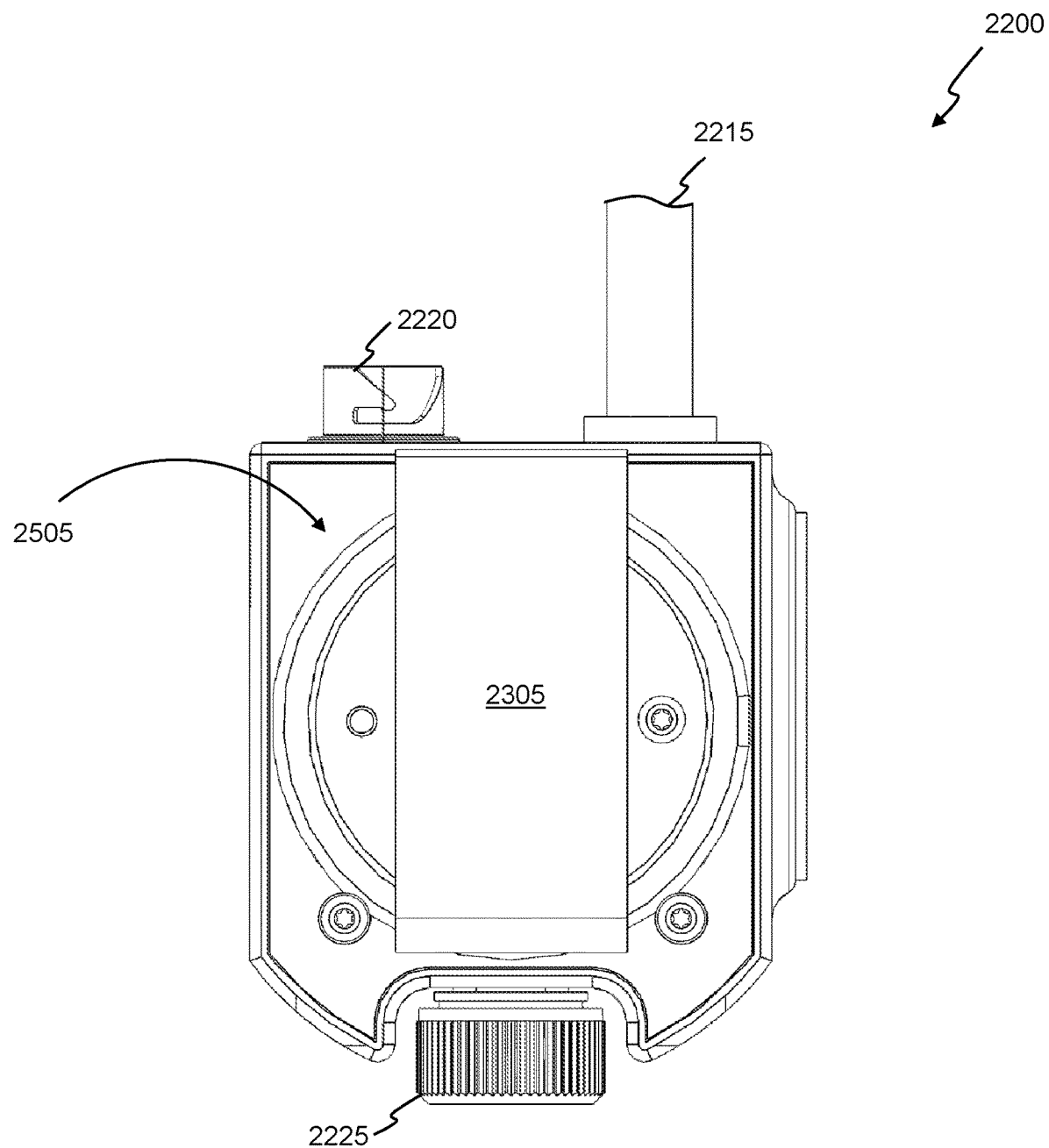
FIG. 25 illustrates a rear view of the audio hub, in accordance with yet still other embodiments.
Figure 26:
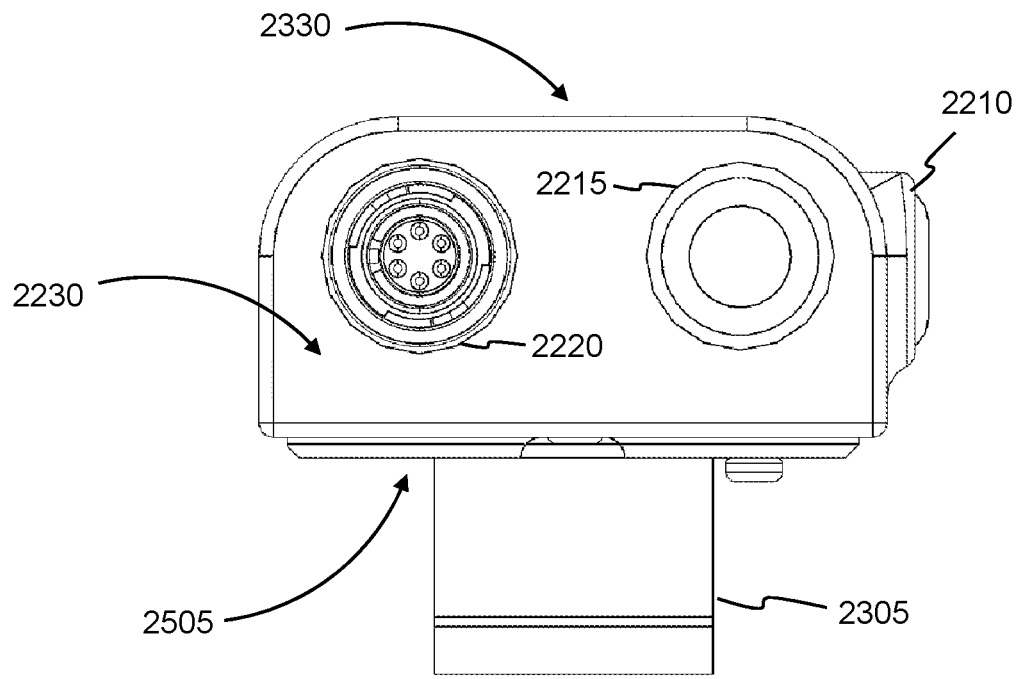
FIG. 26 illustrates a top view of the audio hub, in accordance with some embodiments.
Figure 27:
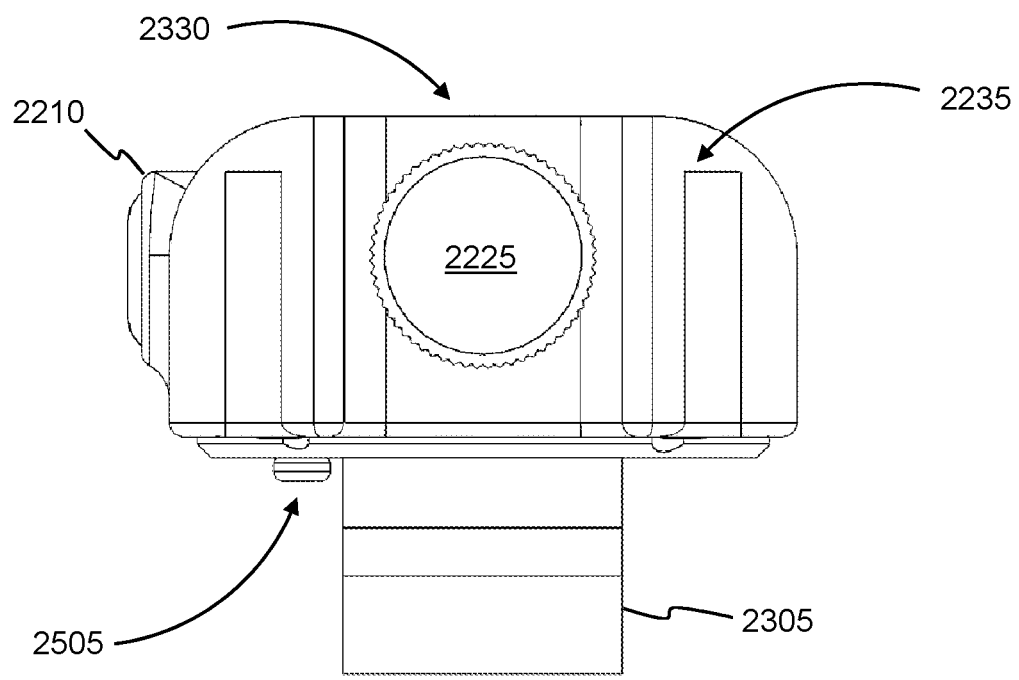
FIG. 27 illustrates a bottom view of the audio hub, in accordance with some embodiments.

Returning now to the discussion of the housing 1300, which houses the aforementioned electronic devices. The internal environment 1420 is positioned between the front portion 1605 and the rear portion 1515. Although the internal environment 1420 is shown as being substantially rectangular in shape, the component can have any shape that facilitates one or more embodiments of the instant disclosure (e.g., oval, oblong, square, polygonal, other shapes, or a combination of two or more thereof). Turning now to FIGS. 16B and 16C, which depict a top view of the user 101 wearing the WCN 110 on their back and the associated RF radiation pattern associated with each angle of the antenna elements 106. The front portion 1605 is smaller in width relative to the rear portion 1515. The WCN 110 performance characteristics, and hence those of the network, increase as the device achieves a 360° RF radiation pattern; however, such coverage is frustrated when the antenna elements 106 are not positioned and oriented in a manner to substantially achieve the 360° antenna coverage.

To achieve the 360° RF radiation pattern with the antenna elements 106 that are positioned in the shoulder strap 115, the housing 1300 includes at least one (ideally two) angular side 1440 is coupled to (i.e. connects) the front portion 1605 and the rear portion 1515, which are oriented substantially parallel to each other. The angular side 1440 includes an antenna slot 1615 positioned within that holds at least one antenna element 106. As shown in FIG. 16B, the angular side 1440 is oriented at an angle of about 35° to 65° (+/−3°) relative to the rear portion 1515 to thereby allow the antenna element 106 to transmit or receive a greater amount of EM radiation behind the user compared to an angle of about 90°, as depicted in FIG. 16C. Here, an increased portion of a beam width 1620 (oriented at an angle of about 35° to 65° (+/−3°)) is projected behind the user 101 compared to beam width 1630 (oriented at an angle of about 90°). To be sure, the rear portion 1515 includes a cooling panel 120 that is made of a metal (e.g., aluminum) and is demountably affixed to the housing 1300 via one or more demountable fasteners 305 and thereby covers the internal environment 1420.

Figure 12:
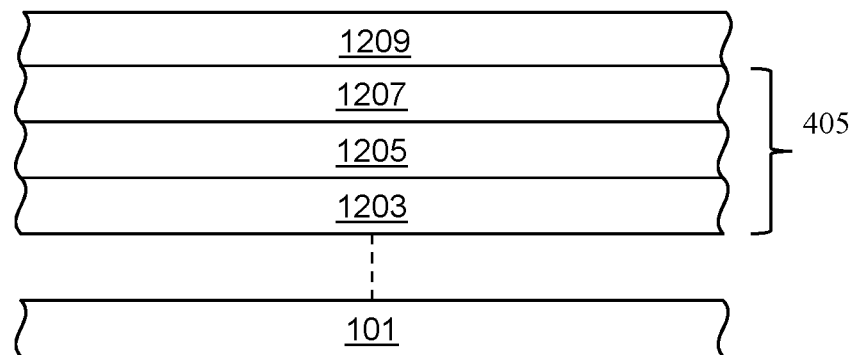
FIG. 12 illustrates a cross-section of a rear panel of the WNC positioned proximate to the user of FIG. 1B, in accordance with certain embodiments.

The cooling panel 120 is partially exposed to the ambient environment of the enclosure 125 and thermally couples the internal environment 1420 to the ambient environment and thereby functions as a heatsink to bleed heat generated within the internal environment therefrom. As a metal object, the cooling panel 120 can partially block the rear RF radiation that emanates from the antenna element(s) 106 of the housing 1300. Such blockage must be addressed to substantially achieve the 360° RF radiation pattern discussed above. Health risks to the user 101 should also be taken in to consideration. For example, the user 101 should be at least partially shielded from EM radiation that emanates from the housing 1300. For example, as the back panel 405 of the enclosure 125 is positioned between the torso and the housing 1300, the back panel 405 can include one or more EMI shielding layers 1207 that reflects (blocks, absorbs, and/or shields) EM radiation (e.g., such as RF radiation) that emanates from the enclosure 125 (i.e. the housing 1300 that includes the antenna element 106) away from the user 101. As shown in FIG. 12, the back panel 405 can be a multilayered structure that includes an external layer 1203 positioned proximate to a cushion layer 1205, which is positioned proximate an EMI shielding layer 1207. Internal components 1209 are positioned proximate to the EMI shielding layer 1207 and can at least include the housing 1300 and its components.

The housing 1300 can include one or more cable glands 1435 (e.g., an IP 67 rated cable gland). To increase the performance time of the WCN 110 and avoid downtimes due to charging the battery 1315, the battery 1315 should be replaceable. For example, the housing 1300 can include a battery access port 1425 that receives the battery 1315 into the internal environment 1420 and is covered by a port covering 1505. The battery access port 1425 can be positioned proximate to the bottom end 1410 or any location that satisfies one or more embodiments of the instant disclosure. The port covering 1505 is demountably secured to the battery access port 1425 via one or more demountable fasteners 1510. To be sure, all seals of the WCN 110 should be formed in a manner to have a protection rating of IP65 or higher.

Turning now to FIGS. 22-27. To facilitate communications, the user 101 should be able to communicate via the WCN 110 with or without the use of a headset known in the art or compatible therewith. For example, a headset can be directly conductively coupled to the audio port 1350 for audio communications or conductively coupled to the audio port 1350 via the audio hub 2200. To be sure, the audio hub 2200 can include more or less components than depicted or disclosed herein and the positioning of such components can vary compared to those depicted or disclosed herein. The audio hub 2200 can be manufactured using the same materials and processes as those of the housing 1300 as well as have a protection of IP65 or higher. The audio hub 2200 includes a main body 2205, which includes a top area 2230, a bottom area 2235, a front area 2330, and a rear area 2505. The audio hub 2200 can be a single unit or multiple elements/components combined to form a single unit. A button 2210 (e.g., a push-to-talk button) is positioned on a side of the audio hub 2200 to provide push-to-talk capabilities (i.e. press the button to enable audio transmission). A volume knob 2225 is positioned proximate to the bottom area 2235. An audio port 2220 is positioned proximate to the top area 2230 opposite the volume knob 2225. A cable 2215 is positioned proximate to the top area 2230 to facilitate its connection to the audio port 1350. The headset connects to the audio hub 2200 which connects to the audio port 2220. The audio hub 2200 demountably attaches to the shoulder strap 115 via a demountable fastener 2305 (e.g., a clip or similar demountable fastener).

Figure 28:
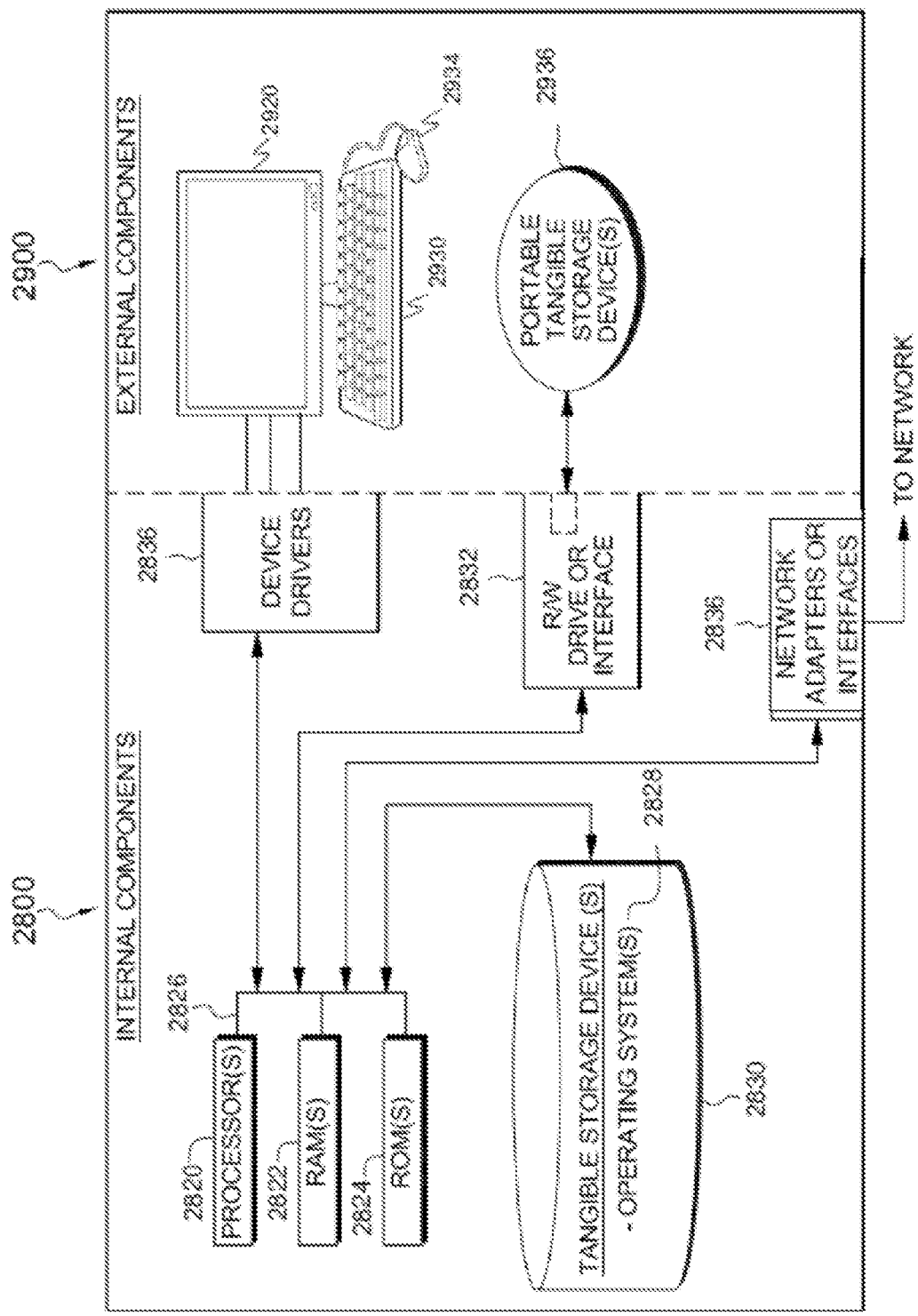

FIG. 28 depicts a block diagram of components of the WCN 100, in accordance with an embodiment of the present invention. Data processing system 500, 600 is representative of any electronic device capable of executing machine-readable program instructions. Data processing system 500, 600 may be representative of a smart phone, a computer system, PDA, or other electronic devices. Examples of computing systems, environments, and/or configurations that may represented by data processing system 500, 600 include, but are not limited to, personal computer systems, server computer systems, thin clients, thick clients, wearable computer, hand-held or laptop devices, multiprocessor systems, microprocessor-based systems, network PCs, minicomputer systems, and distributed cloud computing environments that include any of the above systems or devices.

FIG. 28 depicts a block diagram of components of the WCN 100, in accordance with an embodiment of the present invention. Data processing system 2800, 2900 is representative of any electronic device capable of executing machine-readable program instructions. Data processing system 2800, 2900 may be representative of a smart phone, a computer system, PDA, or other electronic devices. Examples of computing systems, environments, and/or configurations that may represented by data processing system 2800, 2900 include, but are not limited to, personal computer systems, server computer systems, thin clients, thick clients, wearable computer, hand-held or laptop devices, multiprocessor systems, microprocessor-based systems, network PCs, minicomputer systems, and distributed cloud computing environments that include any of the above systems or devices.

The WCN 100 includes respective sets of internal components 2800 and external components 2900 as illustrated in FIG. 28. Each of the sets of internal components 2800 includes one or more processors 2820, one or more computer-readable RAMs 2822 and one or more computer-readable ROMs 2824 on one or more buses 2826, and one or more operating systems 2828 and one or more computer-readable tangible storage devices 2830. The files 1345 are stored on one or more of the respective computer-readable tangible storage devices 2830 for execution by one or more of processors 2820 via one or more of the respective RAMs 2822 (which typically include cache memory). In the embodiment illustrated in FIG. 28, each of the computer-readable tangible storage devices 2830 is a magnetic disk storage device of an internal hard drive. Alternatively, each of the computer-readable tangible storage devices 2830 is a semiconductor storage device, such as ROM 2824, EPROM, flash memory or any other computer-readable tangible storage device that can store a computer program and digital information.

Internal components 2800 also include a R/W drive or interface 2800 to read from and write to one or more portable computer-readable tangible storage devices 2936, such as a CD-ROM, DVD, memory stick, magnetic tape, magnetic disk, optical disk or semiconductor storage device. The files 1345 can be stored on one or more of the respective portable computer-readable tangible storage devices 2936, read via the respective R/W drive or interface 2832 and loaded into the respective computer-readable tangible storage devices 2830.

Each set of internal components 2800 also includes network adapters or interfaces 2836 such as a TCP/IP adapter cards, wireless Wi-Fi interface cards, or 3G or 4G wireless interface cards or other wired or wireless communication links. The files 1345 can be downloaded to the WCN 100, respectively, from an external computer via a network (for example, the Internet, a local area network or other, wide area network) and respective network adapters or interfaces 2836. From the network adapters or interfaces 2836, the files 1345 in the WCN 100 are loaded into the respective computer-readable tangible storage devices 2830. The network may comprise copper wires, optical fibers, wireless transmission, routers, firewalls, switches, gateway computers and/or edge servers.

Each of the sets of external components 2900 can include a computer display monitor 2920, a keyboard 2930, and a computer mouse 2934. External components 2900 can also include touch screens, virtual keyboards, touch pads, pointing devices, and other human interface devices. Internal components 2800 also include device drivers 2840 to interface to computer display monitor 2920, keyboard 2930 and computer mouse 2934. The device drivers 2840, R/W drive or interface 2832 and network adapters or interfaces 2836 comprise hardware and software (stored in storage device 2830 and/or ROM 2824).

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

The invention claimed is:

1. A wearable communications node, comprising:
an enclosure;
a shoulder strap;
a communications device;
an antenna element;
a battery;
a control circuit communicatively coupled to the communications device and the battery;
wherein
the enclosure comprises a top area and a bottom area positioned opposite the top area;
the shoulder strap is pivotably attached proximate to the top area and the bottom area;
the communications device is rigidly affixed within the enclosure;
the antenna element
is conductively coupled to the communications device;
is rigidly affixed to the enclosure or flexibly affixed the shoulder strap;
the control circuit is configured to:
establish, via the communications device, a self-organizing local area network ("LAN") with a plurality of computing devices that each connects directly, dynamically, and non-hierarchically to the LAN;

the enclosure is worn on the torso of a user via the shoulder strap;

the enclosure comprises:
   a top area positioned proximate to a shoulder area of the user:
   a bottom area positioned distal to the shoulder area and opposite the top area;
   the top area comprises:
      a control panel
         communicatively coupled to the control circuit;
         positioned proximate to the top area;
      an overlap element that extends from the top area opposite the bottom area; and
   the overlap element is coupled to the shoulder strap in a manner to allow the shoulder strap to orient the overlap element towards the user and thereby visually shield the control panel when the wearable communications node is worn.

2. The wearable communications node of claim 1, wherein
the antenna element comprises:
   a conductive composition comprising:
      fully exfoliated single sheets of graphene;
      a polymer;
   the fully exfoliated single sheets of graphene
      form a three-dimensional percolated network within the polymer; and
      are separated on a nanoscale within the polymer.

3. The wearable communications node of claim 1, wherein
the enclosure comprises:
   a housing rigidly affixed within the enclosure;
   a cooling panel demountably affixed to the housing;
   the housing is a rigid and hollow structure that comprises:
      a front portion that is oriented away from and positioned distal to the user;
      a rear portion that is oriented towards and positioned proximate the user;
      an opening that is positioned on the front portion that allows access to an internal environment of the housing;
   the internal environment is positioned between the front portion and the rear portion;
   at least one of the control circuit, the communications device, and battery are rigidly affixed within the internal environment;
   the cooling panel
      demountably couples to the opening via a demountable fastener and thereby covers the internal environment;
      is partially exposed to an ambient environment of the enclosure; and
      thermally couples the internal environment to the ambient environment.

4. The wearable communications node of claim 1, wherein
the enclosure comprises:
   a housing rigidly affixed within the enclosure that comprises:
      a front portion that is oriented away from and positioned distal to the user;
      a rear portion that is oriented towards and positioned proximate the user;
      a top end positioned proximate to a shoulder area of the user;
      a bottom end positioned distal to the shoulder area and opposite the top end;
      a front panel;
      a back panel;
   wherein
      the housing is a hollow and rigid structure;
      at least one of the control circuit, the communications device, and battery are rigidly affixed within the housing;
      the back panel
         is affixed proximate to a rear portion of the housing;
         is positioned between the torso and the housing; and
         comprises an EMI shielding material that reflects EM radiation that emanates from the enclosure away from the user.

5. The wearable communications node of claim 1, wherein
the antenna element comprises an antenna array.

6. The wearable communications node of claim 1, wherein
the shoulder strap comprises a front strap panel and a rear strap panel peripherally affixed together;
the rear strap panel is positioned proximate to and oriented towards the user;
the front strap panel is oriented away from the user;
the antenna element is positioned between the front strap panel and the rear strap panel; and
the rear strap panel comprises an EMI shielding material to thereby reflect EM radiation that emanates from the antenna element away from the user.

7. The wearable communications node of claim 1, wherein
the enclosure comprises a housing;
the housing is a rigid and hollow structure that is affixed within the enclosure;
the housing comprises:
   a front portion that is oriented away from and positioned distal to the torso;
   a rear portion that is oriented towards and positioned proximate to the torso;
   a top end positioned proximate to a shoulder area of the user;
   a bottom end positioned distal to the shoulder area and opposite the top end;
   an internal environment that comprises the battery demountably coupled therein;
   a battery access port externally accessible and positioned proximate to the bottom end; and
the battery access port provides access to the internal environment and receives the battery.

8. The wearable communications node of claim 1, wherein
the enclosure comprises an output device;
the output device is communicatively coupled to the control circuit;
the output device is at least partially externally positioned on the enclosure;
the control circuit is configured to:
   generate a first notification when the LAN is established;
   generate a second notification when the LAN is not established;
   convey, via the output device, the first notification; and
   convey, via the output device, the second notification.

9. The wearable communications node of claim 1, wherein
the enclosure comprises:
the antenna element;
a housing;
the housing comprises:
a front portion that is oriented away from and positioned distal to the torso;
a rear portion that is oriented towards and positioned proximate the torso;
an angular side coupled to the front portion and the back portion;
the front portion and the rear portion are oriented substantially parallel to each other;
the angular side comprises an antenna slot positioned within; and
the front portion is smaller in width compared to the rear portion; and
the angular side is oriented at an angle of 35° to 65° relative to the rear portion to thereby allows the antenna element to transmit or receive a greater amount of EM radiation behind the user compared to an angle of 90°.

10. A wearable communications node, comprising:
an enclosure;
a shoulder strap;
a communications device;
a plurality of antenna elements that comprise a first antenna element and a second antenna element;
a battery;
a control circuit communicatively coupled to the communications device and the battery;
wherein
the enclosure comprises a top area and a bottom area positioned opposite the top area;
the shoulder strap is pivotably attached proximate to the top area and the bottom area;
the communications device is rigidly affixed within the enclosure;
the plurality of antenna elements are each conductively coupled to the communications device;
the first antenna element is rigidly affixed to the enclosure;
the second antenna element is flexibly affixed the shoulder strap;
the battery is conductively coupled to the communications device;
the control circuit is configured to:
establish, via the communications device, a self-organizing local area network ("LAN") with a plurality of computing devices that each connects directly, dynamically, and non-hierarchically to the LAN;
the enclosure is worn on the torso of a user via the shoulder strap;
the enclosure comprises:
a top area positioned proximate to a shoulder area of the user;
a bottom area positioned distal to the shoulder area and opposite the top area;
the top area comprises:
a control panel
communicatively coupled to the control circuit;
positioned proximate to the top area;
an overlap element that extends from the top area opposite the bottom area; and
the overlap element is coupled to the shoulder strap in a manner to allow the shoulder strap to orient the overlap element towards the user and thereby visually shield the control panel when the wearable communications node is worn.

11. The wearable communications node of claim 10, wherein
the plurality of antenna elements each comprises:
a conductive composition comprising:
fully exfoliated single sheets of graphene;
a polymer;
the fully exfoliated single sheets of graphene
form a three-dimensional percolated network within the polymer; and
are separated on a nanoscale within the polymer.

12. The wearable communications node of claim 11, wherein
the enclosure comprises:
a housing rigidly affixed within the enclosure;
a cooling panel demountably affixed to the housing;
the housing is a rigid and hollow structure that comprises:
a front portion that is oriented away from and positioned distal to the torso;
a rear portion that is oriented towards and positioned proximate the torso;
an opening that is positioned on the front portion and allows access to an internal environment of the housing;
the internal environment is positioned between the front portion and the rear portion;
the control circuit and the communications device are both rigidly affixed within the internal environment;
the cooling panel
demountably couples to the opening via a first demountable fastener and thereby covers the internal environment; and
is partially exposed to an ambient environment of the enclosure and thereby thermally couples the internal environment to the ambient environment.

13. The wearable communications node of claim 12, wherein
the housing comprises:
a top end positioned proximate to a shoulder area of the user;
a bottom end positioned distal to the shoulder area and opposite the top end;
the enclosure comprises:
a front panel;
a back panel;
the back panel
is affixed proximate to a rear portion of the housing;
is positioned between the torso and the housing; and
comprises an EMI shielding material that reflects EM radiation that emanates from the enclosure away from the user.

14. The wearable communications node of claim 13, wherein
at least one of the first antenna element and the second antenna element comprises an antenna array.

15. The wearable communications node of claim 14, wherein
the shoulder strap comprises:
a front strap panel;
a rear strap panel peripherally affixed to the front strap panel;
the rear strap panel is positioned proximate to and oriented towards the user;
the front strap panel is oriented away from the user;

the antenna element is positioned between the front strap panel and the rear strap panel; and the rear strap panel comprises an EMI shielding material to thereby reflect EM radiation that emanates from the second antenna element away from the user.

* * * * *